US008903758B2

(12) United States Patent
Nephew

(10) Patent No.: US 8,903,758 B2
(45) Date of Patent: Dec. 2, 2014

(54) GENERATING NAVIGABLE READABLE PERSONAL ACCOUNTS FROM COMPUTER INTERVIEW RELATED APPLICATIONS

(71) Applicant: Jill Benita Nephew, Sebastopol, CA (US)

(72) Inventor: Jill Benita Nephew, Sebastopol, CA (US)

( * ) Notice: Subject to any disclaimer, the term of this patent is extended or adjusted under 35 U.S.C. 154(b) by 287 days.

(21) Appl. No.: 13/622,858

(22) Filed: Sep. 19, 2012

(65) Prior Publication Data

US 2013/0254154 A1     Sep. 26, 2013

Related U.S. Application Data

(60) Provisional application No. 61/536,781, filed on Sep. 20, 2011.

(51) Int. Cl.
G06F 17/00 (2006.01)
G06N 5/04 (2006.01)
G06F 15/18 (2006.01)
G06N 5/02 (2006.01)

(52) U.S. Cl.
CPC ..................... G06N 5/022 (2013.01)
USPC ........................................................ 706/61

(58) Field of Classification Search
USPC ........................................................ 706/61
See application file for complete search history.

(56) References Cited

U.S. PATENT DOCUMENTS

| | | | |
|---|---|---|---|
| 6,701,322 B1 | 3/2004 | Green | |
| 7,698,640 B2 | 4/2010 | Krieglstein | |
| 7,874,841 B1 | 1/2011 | Lycas | |
| 7,953,069 B2 * | 5/2011 | Connor | 370/352 |
| 8,226,418 B2 | 7/2012 | Lycas | |
| 8,311,965 B2 * | 11/2012 | Breitwisch et al. | 706/45 |
| 8,568,330 B2 * | 10/2013 | Mollicone et al. | 600/508 |
| 8,568,998 B2 * | 10/2013 | Mani et al. | 435/7.23 |
| 8,589,320 B2 * | 11/2013 | Breitwisch et al. | 706/15 |
| 8,606,387 B2 * | 12/2013 | Tsai et al. | 700/108 |
| 8,670,925 B2 * | 3/2014 | Gluck | 701/409 |
| 8,750,383 B2 * | 6/2014 | Milstein | 375/240.19 |
| 8,832,010 B2 * | 9/2014 | Rajendran et al. | 706/38 |
| 8,832,011 B2 * | 9/2014 | Rajendran et al. | 706/38 |
| 8,837,309 B2 * | 9/2014 | Connor | 370/252 |
| 2002/0077888 A1 | 6/2002 | Chiang | |
| 2004/0186743 A1 | 9/2004 | Cordero | |
| 2006/0112114 A1 | 5/2006 | Yu et al. | |
| 2007/0016607 A1 | 1/2007 | Yu et al. | |
| 2007/0094205 A1 | 4/2007 | Yu et al. | |
| 2007/0094206 A1 | 4/2007 | Yu et al. | |
| 2007/0261071 A1 | 11/2007 | Lunt et al. | |
| 2008/0005666 A1 | 1/2008 | Sefton et al. | |

(Continued)

OTHER PUBLICATIONS

Wisdom Legacy, Wisdom Legacy, www.wisdomlegacy.org/Default.aspx?pub=1, printed Oct. 23, 2012, 4.

(Continued)

*Primary Examiner* — Michael B Holmes
(74) *Attorney, Agent, or Firm* — Goodsill Anderson Quinn & Stifel LLP

(57) ABSTRACT

A system for using a rules based, dynamic, non-linear computer interview to capture a user's subjective human experience and storing those experiences in a highly structured manner in the form of a computer based bi-directional graph and using that graph and a computer system to generate navigable readable personal accounts tailored to an intended audience is presented.

18 Claims, 25 Drawing Sheets

(56) References Cited

U.S. PATENT DOCUMENTS

| | | |
|---|---|---|
| 2009/0085343 A1 | 4/2009 | Burch |
| 2009/0313295 A1 | 12/2009 | Blaxland et al. |
| 2010/0100826 A1 | 4/2010 | Hawthorne et al. |
| 2010/0107075 A1 | 4/2010 | Hawthorne et al. |
| 2010/0114937 A1 | 5/2010 | Hawthorne et al. |
| 2011/0113041 A1 | 5/2011 | Hawthorne et al. |
| 2011/0136085 A1 | 6/2011 | Leroy |

OTHER PUBLICATIONS

Lifebio, How to Write Biography, www.lifebio.com/Home/How-Write-Biography, printed Oct. 23, 2012, 2.

The Remembering Site, The Remembering Site, www.therememberingsite.org, printed Oct. 23, 2012, 3.

Stage of Life LLC, Stage of Life—Changing the World One Story at a Time, www.stageoflife.com/Defaultaspx, printed Oct. 23, 2012, 2.

Write My Memoirs 2.0, Home—Write My Memoirs 2.0, www.writemymemoirs.com, printed Oct. 23, 2012, 2.

Kahn, Solomon, About | Memoir Place, www.memoirplace.com/pages/about, printed Oct. 23, 2012, 2.

\* cited by examiner

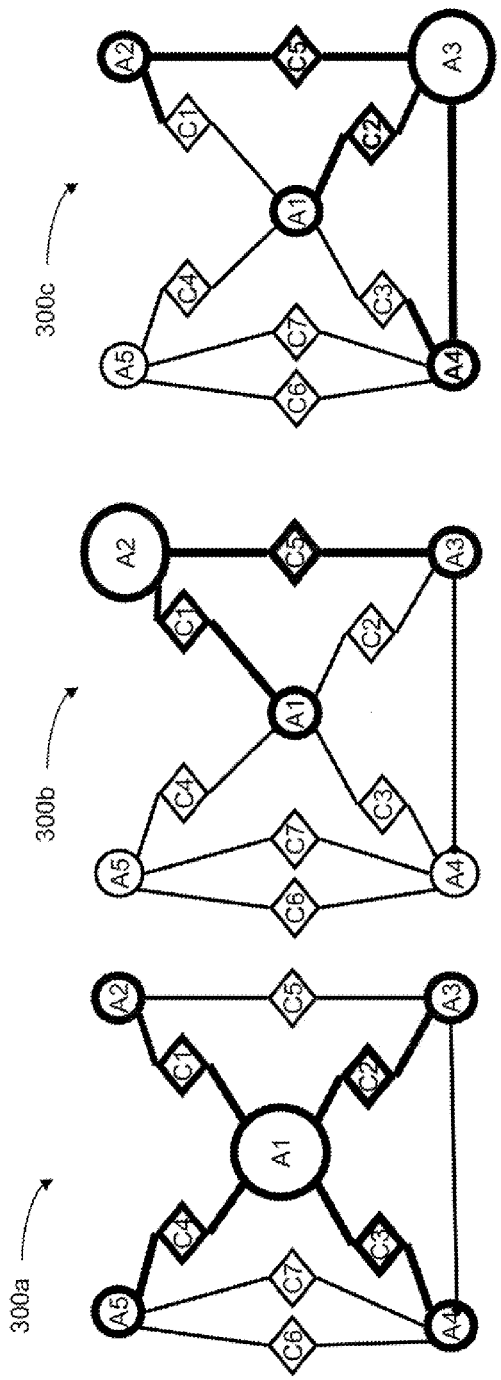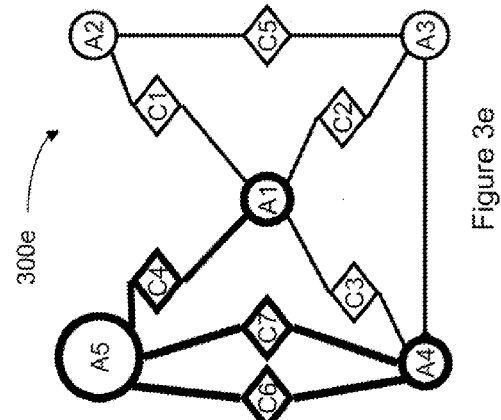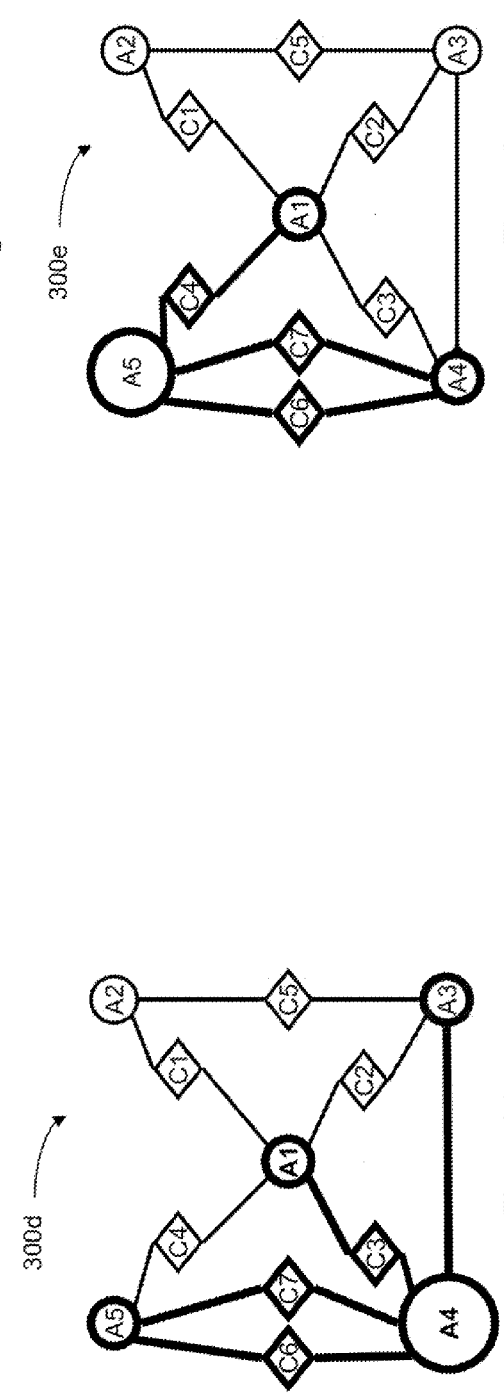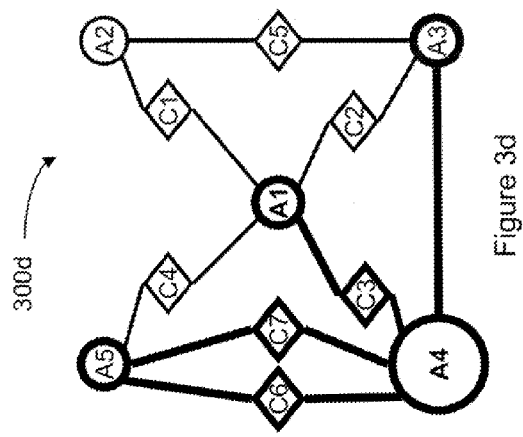

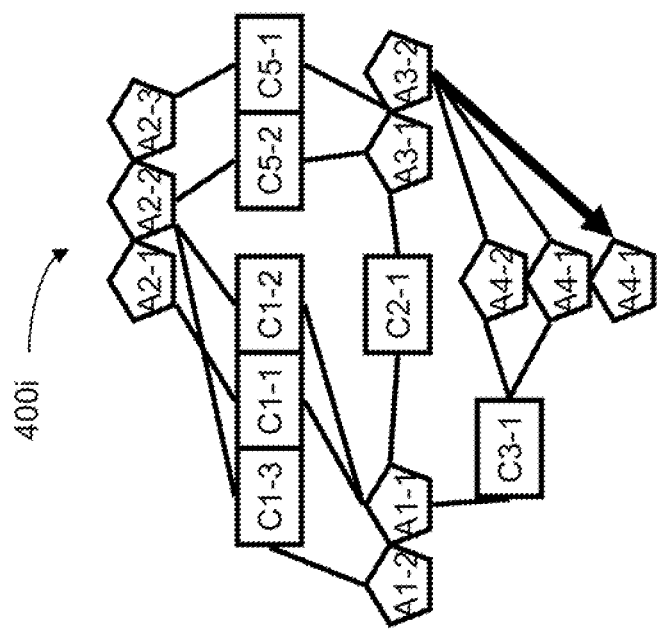

GENERATING NAVIGABLE READABLE PERSONAL ACCOUNTS FROM COMPUTER INTERVIEW RELATED APPLICATIONS

This application claims priority to U.S. Provisional Patent Application No. 61/536,781, filed Sep. 20, 2011, and entitled "Generating and Matching Memoirs" by Jill Benita Nephew, which is incorporated herein by reference.

BACKGROUND

When people want to pass on their subjective human experience or wisdom to others, the tool of choice is often a personal account of some sort, such as a memoir.

Through informal interview by the inventor, it is estimated that there are many more people who would like to share their personal accounts but run up against barriers to doing so.

One barrier is not enough guidance. Again, through informal interview, it was found that many people begin personal accounts, but do not know what decisions to make to proceed and become confused or overwhelmed. For example, it isn't clear where to begin, what to talk about or when to include it in a personal account, how to arrange topics, how to navigate their life, what to include, or what not to. There are many books on the topic that give instruction, but it still leaves the task of organizing, navigating and arranging one's topic to the writer which is often substantially more effort than the person is willing to exert.

Another barrier is loss of interest and abandonment. Again through informal interview, many people had started personal accounts, gotten a few pages in and lost interest or motivation in part due to the tedium of recording their life as a linear progression. The process was not engaging, pleasant or rewarding enough to sustain itself to completion.

Another barrier is unclear audience. Again through informal interview, it was found that while many people feel a sincere urge to pass on their life wisdom, they did not consider a specific audience while creating their written account other than the general public. However, personal accounts written for the general public may not be appropriate for immediate family, close community etc. And personal accounts written for the general may not reach the public without formal publishing and promotion which is well beyond the scope of what most people were willing to do.

Traditional writing of personal accounts require all subjects or 'sections' to be laid out in a linear manner with information building as the written account progresses as it is assumed that all readers will read the personal account from beginning to end and it would be difficult to re-arrange the subjects or 'sections' at a later time.

This structure forces the writer to make many difficult and complex decisions as they write, as they have tasked themselves with effectively writing a book which is a naturally overwhelming task, thus creating the first barrier above.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique to reduce the burden of making decisions and to reduce the barrier of not enough guidance is to use a computer system to decouple the decisions of arranging subjects from writing about them. In this way the user only needs to concentrate on the simple task of writing about a single subject.

A way to decouple the decision for arranging subjects from writing about them is to use the computing system to create a computer model that creates and stores connections between different subjects that are related as well as text that serves as a transition between subjects or describes how they are related. A computing system can then assemble the subjects using the transitional text as the text that serves as a transition or connection between two subject. For example, a first subject and a second subject can be used starting from the first subject to introduce or connect the second subject, or from the second subject to introduce or connect the first subject. In this way, at any point separate from writing, this computer model that creates and stores connections forms a bi-directional graph that a computing system can enter from any subject and traversed a multitude of ways to define different layouts including different subsets of subjects linked together with the text from the connections.

The barrier of which topics to include is two fold. One set of decision has to do with deciding if a subject should be included because it is important to the writer, another set is if it should included for the audience. A way to reduce the burden of these decisions is to decouple these decisions and postpone the decision of which should be included for the audience as the set of which should be included for the audience is a subset of which should be included because it is important to the writer.

A way to reduce the burden of when to introduce subjects and which to include for the writer is to first create a set of categories for subjects that the user selects and is intuitive and obvious. Next create a set of questions or prompts that ask about how the current subject relates to a subject of a different category in an important way and use a computer system to apply rules or criteria for matching subjects within the current subject category with the subjects within a related subject category. A computer system that is storing and categorizing all the subjects that have already been created can then prompt the user with all the subjects they have already created that pass these criteria under a given category and the user can simply choose whichever ones are recognized as important reducing the burden of which to include. In this way the computer prompting turns a fatiguing human memory search problem into a much simpler human recognition problem. Alternately, the user can create new subjects in response to the prompt. and grow the bi-directional graph.

A way to reduce the barrier of loss of interest and abandonment due to the tedium of a linear progression is to allow users to write in whatever order they are naturally inspired or curious about. Because the computer model bi-directional graph created above is fully connected every subject that connects on a graph is reachable from every other subject via a computer system that can traverse the bi-directional graph. This enables the user to begin anywhere and follow subjects as they are drawn and they are no longer required to follow a linear progression.

In order to help the user navigate in a non-linear writing environment the computer model can store state and record the order the user navigated different subjects so that they can navigate back to an origin subject.

A way to reduce the barrier of loss on interest and abandonment due to the tedium of a linear progression is to formulate subsequent questions based on areas the user has already identified as important or interesting. Responses to previous questions can be used to guide subsequent questions using a computer system that can apply heuristics and token substitution into abstract question 'templates'.

The resulting computer generated questions from these templates result in triggering a users natural curiosity about themselves or help them 'reflect' is a way to maintain engagement. Further, if the question includes their own written text about a subject they are already engaging then the question will 'mirror them' and be inviting and pleasant. In this way the overall experience will be having a computer interview instead of writing a book.

A technique to reduce the barrier of unclear audience is to use a computer system to first separate out the writing for themselves from the writing for others as mentioned above. As a separate step the user can now choose an audience and using the computing system and the bi-directional graph traverse the graph from a source subject that the user believes is of paramount interest to their audience, and select only the subset of the tree of related subjects they created previously relevant to their audience.

They can also use the computer system to review their stored answers of the selected subjects and again only select subsets relevant to their audience. They can also use the computing system to edit and store their answers in a separate written account using wording relevant to their audience. They can also use the computing system to control layout of the edited answers forming sections of a written account. They can also use the computing system to create links between subjects to generate special documents to be read on a computing device that allow the audience to read the written account easily, navigating between related subjects in whatever order pleases them.

This results in using the same bi-directional graph to generate many different written accounts from different subsets of contained subjects, with different subsets of answers with different wordings so that each written account can be tailored to the specific audience in mind.

A written account that is designed for an intended audience, generated by the computing system described above will be pleasing to read as it contains relevant content, clear transitional text and linking between subjects and is therefore more likely to be shared and consumed by the intended audience and thus promote and encourage the generation of personal accounts.

BRIEF DESCRIPTION OF THE DRAWINGS

Embodiments of the inventions are illustrated in the figures. However the embodiments and figures are illustrative rather than limiting; the provide examples of the invention.

FIG. 3a depicts an example of the data structure coverage of a QT set based on the FIG. 2a example of a data structure for LAT and CT model for LAT A1.

FIG. 3b depicts an example of the data structure coverage of a QT set based on the FIG. 2a example of a data structure for LAT and CT model for LAT A2.

FIG. 3c depicts an example of the data structure coverage of a QT set based on the FIG. 2a example of a data structure for LAT and CT model for LAT A3.

FIG. 3d depicts an example of the data structure coverage of a QT set based on the FIG. 2a example of a data structure for LAT and CT model for LAT A4.

FIG. 3e depicts an example of the data structure coverage of a QT set based on the FIG. 2a example of a data structure for LAT and CT model for LAT A5.

FIG. 4i depicts an example of a data structure for user LAIs and CIs resulting from aggregating LAI connection via existing aggregating LAI selection.

DETAILED DESCRIPTION

Figure 1A:
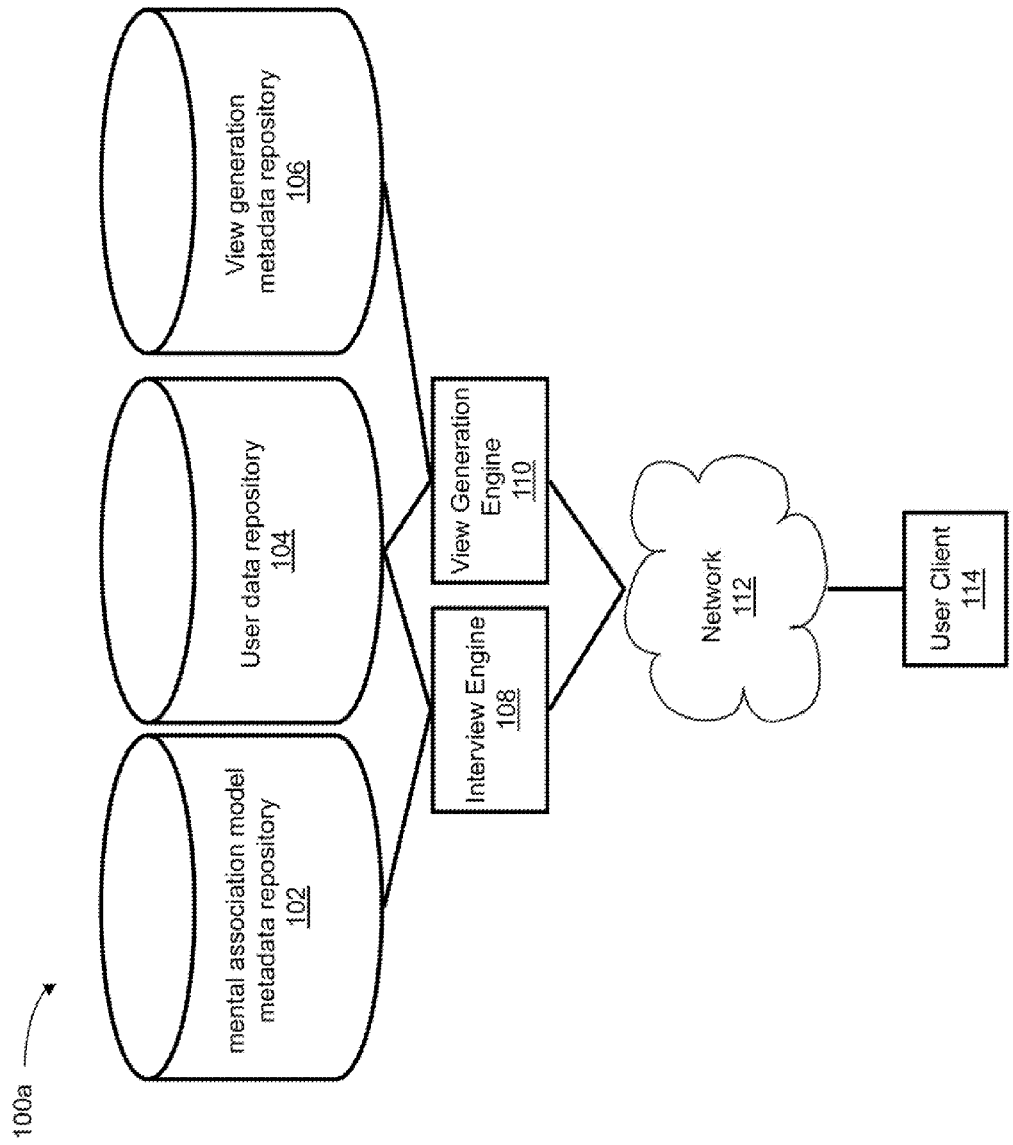
FIG. 1a depicts an example of a system for generating navigable readable personal accounts from a computer interview using a network architecture.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

As used in this paper, a "repository" can be implemented, for example, as software embodied in a physical computer-readable medium on a general- or specific-purpose machine, in firmware, in hardware, in a combination thereof, or in any applicable known or convenient device or system.

The repositories described in this paper are intended, if applicable, to include any organization of data, including tables, comma-separated values (CSV) files, traditional databases (e.g., SQL), or other known or convenient organizational formats.

In an example of a system where a repository is implemented as a database, a database management system (DBMS) can be used to manage the repository. In such a case, the DBMS may be thought of as part of the repository or as part of a database server, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, FileMaker, Informix, Microsoft Access, Microsoft SQL Server, Microsoft Visual FoxPro, MySQL, and OpenOffice.org Base, to name several, however, any known or convenient DBMS can be used.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

As used in this paper, a "computer interview" may include a series of requests and responses between a computing system and an 'user' or single human being.

As used in this paper, "readable" refers to a piece of writing that reads as a narration meaning that can be read sequentially, include multiple subjects and transition between subjects without confusing the reader and concludes with a sense of completion or a 'finish'.

As used in this paper, "navigable" refers to a piece of writing that may include but is not limited to a table of contents, links or hyperlinks, headings, numbering, ordering or other visual mechanisms that allows readers to move from one piece of text to another related piece of text while making the relationship between the one piece of the text to the other piece of text intuitive and obvious.

As used in this paper, a "personal account" is writing a person does consulting only their memories of events and subject human experience.

All personal accounts referred to in this system are navigable and readable (or a 'personal account' is shorthand for a 'navigable readable personal account') and may be automatically generated from a computer interview.

As used in this paper, "related" within data structures refers to the existence of an mechanism that stores a direct relationship between two objects. So if object A is 'related' to object B, there exists a structure that stores the relationship object A and object B. The structure that stores the relationship can answer the question posed by a computer system "what objects are related to A?" as well as answer the question posed by a computer system "what objects are related to B?".

FIG. 1a depicts an example of a system 100a for generating navigable readable personal accounts from a computer interview using a network architecture. In the example of FIG. 1, the system 100a includes a mental association model metadata repository 102, a user data repository 104, a view generation metadata repository 106, an Interview Engine 108, a view generation engine 110, a network 112 and a user client 114.

In the example of FIG. 1a, the mental association model metadata repository 102 is coupled to the interview engine 102; the user data repository 104 is coupled to the interview engine 108 and the view generation engine 110; the view generation metadata repository 106 is also coupled to the view generation engine 110; the interview engine 108 is coupled to the network 112; and the view generation engine 110 is coupled to the network 112; and the network 112 is coupled to the user client 114.

In an embodiment of 100a, each component may be used in isolation or in combination may be included within different computer systems.

In the example of 100a, a "mental association model" can include a variety of metadata, including but not limited to the following: data structures including categorizations of recognizable objects or "life aspect types" or "LATs", data structures including recognizable associations between LATs or "connection types" or "CTs", collections of "question templates" or "QTs" that apply to each "LAT" or "LAT-QTs" and each CT or "CT-QTs", collections of QTs that are meant to characterize the LAT or "LAT-QT describe questions", collections of QTs that are meant to characterize the CT or "CT-QT describe questions", sets of questions associated with a single LAT or "LAT-QT set", sets of questions associated with a CT or "CT-QT set", a categorization of mental retrieval modes or "question types", collections of rules for ordering collections of QTs for presentation to the user or "metadata scripts" etc.

In the example of 100a, the user data repository 104 can include a variety of data, including but not limited to: user created instances of LATs or "life aspect instances" or "LAIs", user created instances of CTs or "connection instances" or "CIs", state information about which LAIs have been created or selected in which order or "train of thought", state information about which QTs have been answered for a given LAI or CI and in what order, stored personal accounts, navigational structures connecting related LAIs and CIs generating resulting "LAI and CI graphs" etc.

In the example of 100a, the view generation repository 106 can include a variety of metadata, including but not limited to the following: view generation metadata including rules for arranging and presenting QT answers, rules for presenting users LAIs and CIs for selection in a personal account resulting in a pruned LAI and CI graph etc. view generation metadata rules for arranging and presenting QT answers are based on but not limited to the following: QT describe answers, the number of related CIs to the included LAIs, traversing the pruned LAI and CI graph from a root LAI etc. View generation metadata rules for presenting users LAIs and CIs for selection in a personal account can include but are not limited to breadth first or depth first traversal of LAI and CI graphs.

In the example of 100a, the interview engine 108 may include a computer processor coupled to memory storing instructions for execution by the processor. The interview engine 108 may receive requests from a user, retrieve information from mental association models as well as LAI and CI repositories and calculate, generate, store and render a response back to the user as a "computer interview".

In the example of 100a, the view generation engine 110 may include a computer processor coupled to memory storing instructions for execution by the processor. The view generation engine 110 may receive requests from a user, retrieve information from view generation metadata as well as user data repositories and calculate, generate, store and render a response back to the user as a "personal account".

The interview engine 108 and the view generation engine 11 each have the ability to traverse user LAI and CI graphs using included navigational structures. Every connection between the CI's and LAIs in a LAI and CI graph can be bi-directional, resulting in the ability of an interview engine or a view generation engine to start from any LAI and traverse to every connected CI and LAI on the graph.

In the example of 100a, the network 112 can be used to distribute information between computing systems.

In the example of 100a, the user client 114 can be a computing system that a user can directly access and may provide input through various means which may include but is not limited to sound, movement and typed text and receive output which may include but is not limited to rendered images, sounds and text.

In operation, in the example of 100a, a personal account may include hierarchical 'sections' that may be based on LAI answers, CI answers or collections of answers. Sections may be connected by references that enable navigation between sections or 'links'. Sections may include 'section headings'.

In operation, in the example of 100a, an LAI is related to another LAI if it is connected directly on the LAI and CI Graph (nearest neighbor) or if it is connected via a single CI in the graph (the set of all LAIs connected directly to all directly connected CIs). An LAI is related to a CI if it is directly connector on the LAI and CI Graph (nearest neighbor).

In operation, in the example of 100a, the system is initiated when a user interacts with a user client 114. Multiple users may use the same mental association model metadata repository 102, user data repository 104, view generation metadata 106, Interview Engine 108, view generation engine 110, network 112 and user client 114. And a single user may use multiple mental association model metadata repositories 102, user data repositories 104, view generation metadata 106, interview engines 108, a view generation engines 110, networks 112 and user clients 114. However it should be noted that in this case the functionality in all components is redundant and perfectly duplicated so the user will not be aware they are using different instances of said components.

The user initiates communication with the system by providing information identifying them uniquely and an address to the interview engine 108 or view generation engine 110. The address is sent from the user client 114 to the network 112 which then looks up the address and establishes connection with and the interview engine 108 and the view generation engine 110. The remainder of the information is sent as a request from the network 112 to the interview engine 108 and the view generation engine 110. The interview engine 108 and the view generation engine 110 use this information to verify the users identity.

Once the users identity is verified, the interview engine 108 and the view generation engine 110 return the user a private means to send requests that may include text, sound, images and other forms of information, and receive responses that may include text, sound, images or other forms of information from the interview engine 108 and the view generation engine 110.

While interacting with the interview engine 108 and the view generation engine 110 the user will have access to all their data included within the user data repository 104 that is private to them as well as and any user data included within the user data repository 104 from others that they have permission to view. Their user data may include LAIs, CIs, personal accounts and other information that is specific only to them.

Many of the responses from the interview engine 108 to the user client 114 via the network 112 consist of using the mental association model metadata from repository 102 in conjunction with user data from repository 104 to render questions.

Many of the requests from the user client 114 to the interview engine 108 via the network 112 consist of answering any questions as part of the last interview engine 108 response as well as providing guidance for choosing the next question using the means mentioned above. The answers included in these requests may be used by the interview engine 108 for instantiating new LAIs, CIs and related navigational structures generating resulting 'LAI and CI graphs', or modifying all said objects.

Many of the responses from the view generation engine 110 to the user client 114 via the network 112 consist of using the view generation metadata from repository 106 in conjunction with user data from repository 104 to render questions that guide the assembly of personal accounts.

Many of the requests from the user client 114 to the view generation engine 110 via the network 112 consist of answering any question as part of the last view generation engine 110 response as well as providing guidance for choosing the next question using the means mentioned above. The answers included in these requests may be used by the view generation engine 110 for generating personal accounts to be sent back to the user client 114 as a response or stored in the user data repository or both.

The system is not terminated while there are users logged into it. A user's interaction with the system is terminated when they log off the system.

Figure 1B:
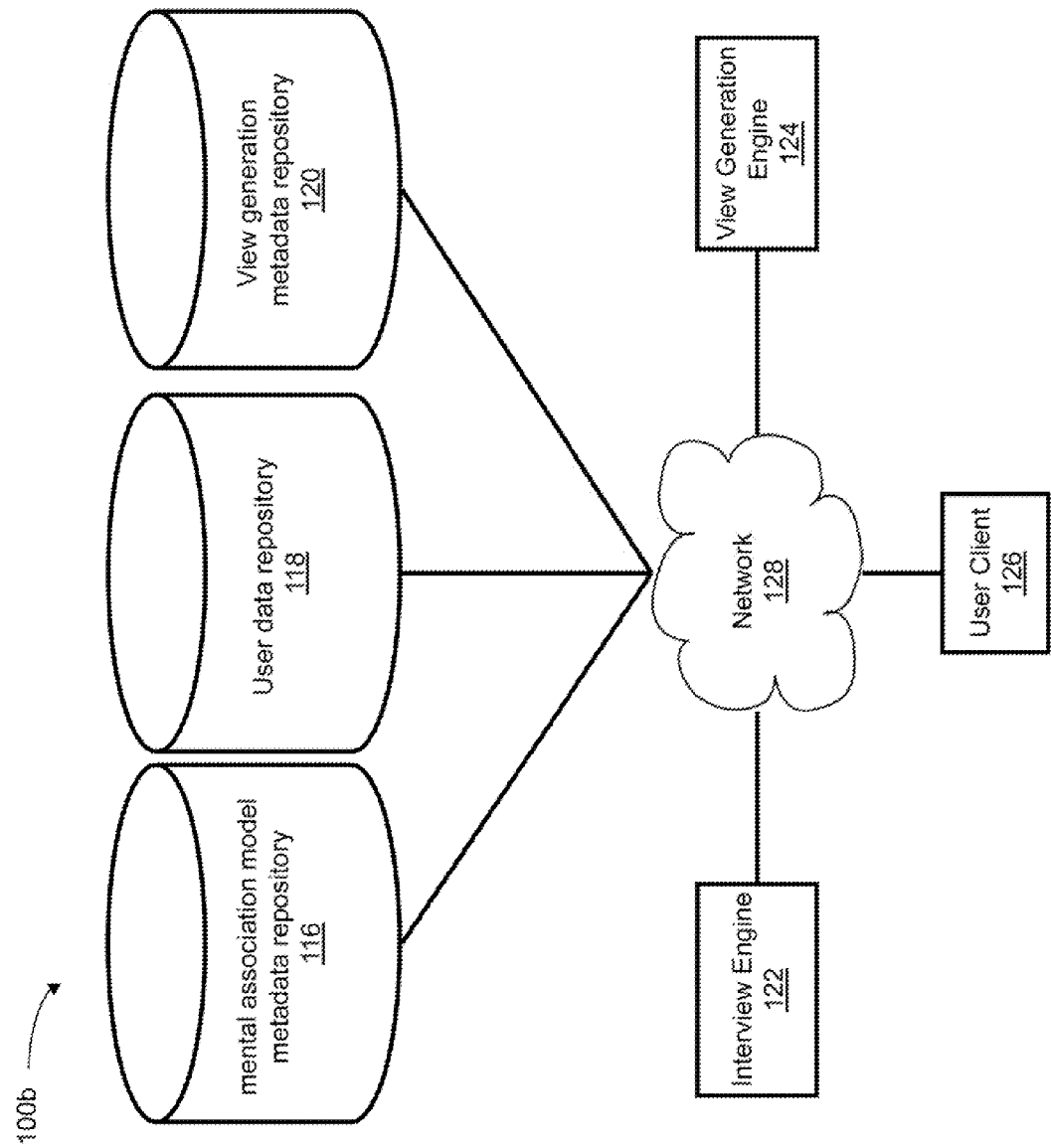
FIG. 1b depicts an example of a system for generating navigable readable personal accounts from a computer interview using a network architecture.

FIG. 1b also depicts an example of a system 100b for generating navigable readable personal accounts from a computer interview using a network architecture. In the example of FIG. 1b, the system 100b includes a mental association model metadata repository 116, a user data repository 118, a view generation metadata repository 120, an interview engine 122, a view generation engine 124, a user client 126 and a Network 128.

In the example of FIG. 1b, the mental association model metadata repository 116 is coupled to the network 128, the user data repository 118 is also coupled to the network 128, the view generation metadata repository 120 is also coupled to the network 128, the interview engine 122 is also coupled to the network 128, the view generation engine 124 is also coupled to the network 128, and the user interface 126 is also coupled to the network 128.

In operation, in the example of 100b, all of the components may work similarly to the example of 100a. However the network 128 now mediates the exchange of information between all the components.

Figure 1C:
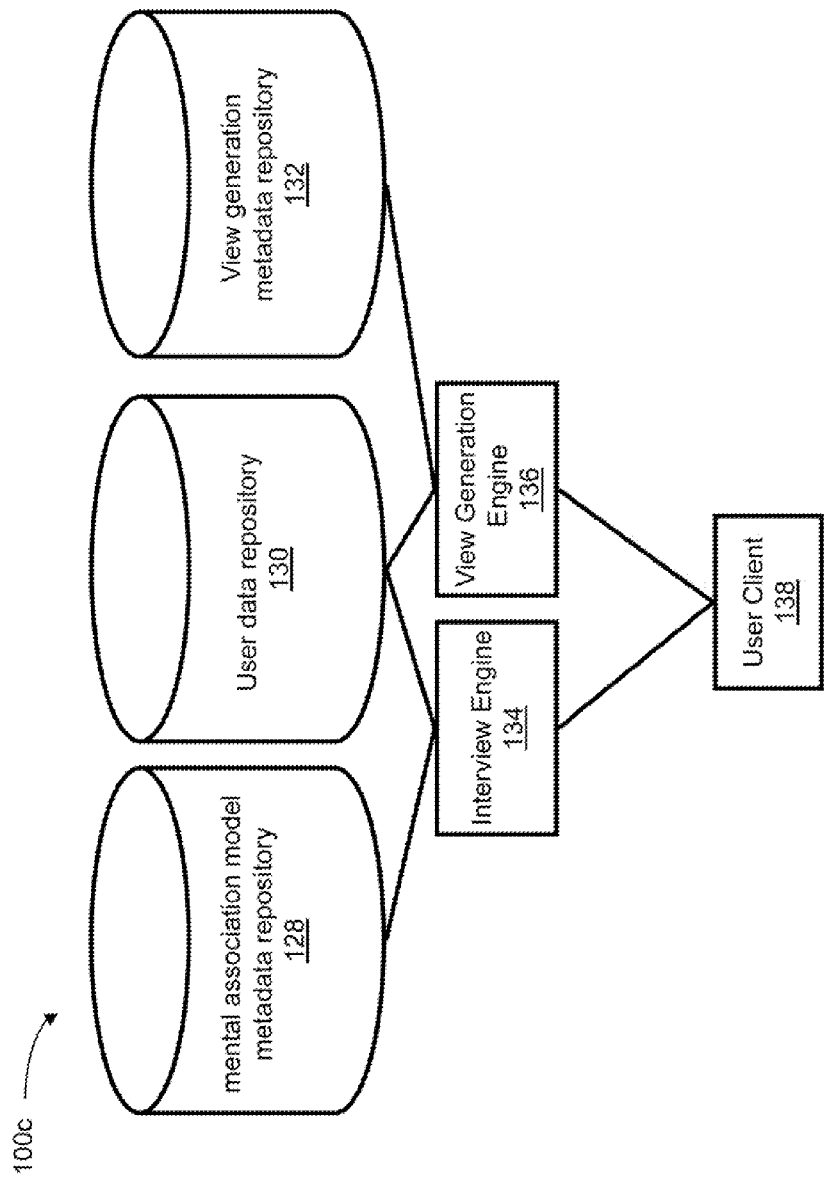
FIG. 1c depicts an example of a system for generating navigable readable personal accounts from a computer interview using a local machine architecture.

FIG. 1c also depicts an example of a system 100c for generating navigable readable personal accounts from a computer interview using a users local machine architecture where all the components shown may reside on a single computing system or combination of computing systems that directly accessible by a user and may exclude all others. In the example of FIG. 1c, the system 100c includes a mental association model metadata repository 116, a user data repository 118, a view generation metadata repository 120, an interview engine 122, a view generation engine 124 and a user client 126.

In the example of 100c these components can be the same as 100a but as shown in FIG. 100c, the mental association model metadata repository 128 is coupled to the interview engine 134, the user data repository 130 is also coupled to the interview engine 134 and the view generation engine 136, the view generation metadata repository 132 is also coupled to the view generation engine 124, the interview engine 122 is coupled to the user client 126 and the view generation engine 136 is also coupled to the user client 138 residing on a single computer system or in another convenient manner.

In operation, in the example of 100c, all of the components may work similarly to the example of 100a. However rather than using a network to mediate the exchange information, the components are directly coupled to each other within a single computing system or some other convenient arrangement. And rather than there being multiple users for a system, there may be just a single user. And rather than having multiple instances of the components there may only be a single instance.

Figure 2B:
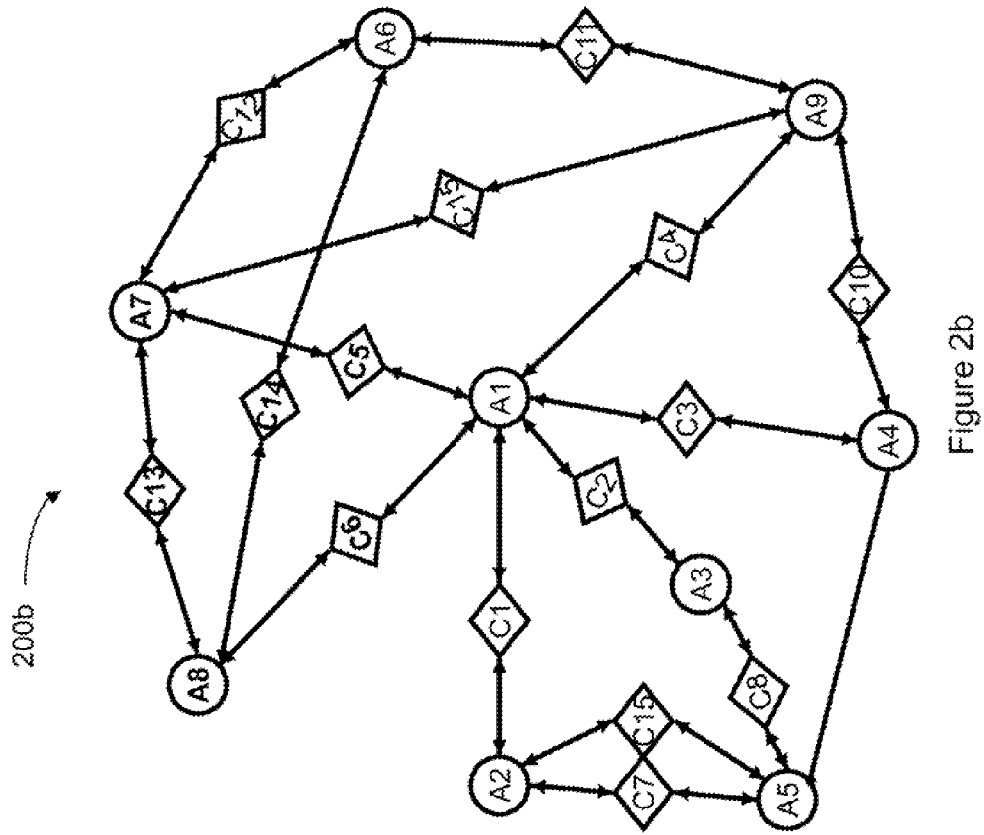
FIG. 2b depicts an alternate example of a data structure for LAT and CT model.
Figure 2A:
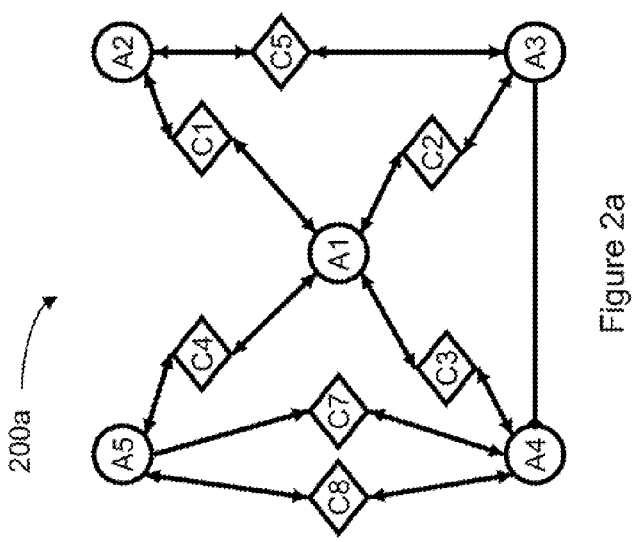
FIG. 2a depicts an example of a data structure for LAT and CT model.

FIG. 2a depicts an example of a mental association model data structure 200a. In the example of FIG. 2a, the data structure 200a includes LATs A1 through A5 and CTs C1 through C8. In the example of FIG. 2a, the LATs are coupled to other LATs either directly as in the A3 to A4 coupling or indirectly through CT couplings. In this example all CTs are only coupled to two different LATs, LATs can be coupled to any number of CTs, and LATs can only be coupled to other LATs using a one-to-many relationship so that one LAT is an 'aggregating' LAT and the other would necessarily be an 'aggregated' LAT. Creation of an aggregated LAT instance requires the connection of an aggregating LAT instance, but the reverse is not true. CTs require the connection of two LATs. LATs do not require the connection of any CTs. LATs cannot connect to themselves directly.

FIG. 2b depicts an alternate example of a mental association model data structure 200b showing more LATs and CTs. In the example of FIG. 2b, the data structure 200b includes LATs A1 through A9 and CTs C1 through C15. In the example of FIG. 2b as in the data structure 200a, the LATs are coupled to other LATs either directly as in the A4 to A5 coupling or indirectly through CT couplings. In this example all CTs are only coupled to two different LATs, LATs can be coupled to any number of CTs, and LATs can only be coupled to other LATs using a one-to-many relationship so that one LAT is an 'aggregating' LAT and the other would necessarily be an 'aggregated' LAT. Creation of an aggregated LAT instance requires the connection of an aggregating LAT instance, but the reverse is not true. CTs require the connection of two LATs. LATs do not require the connection of any CTs. LATs cannot connect to themselves directly.

Figure 2C:
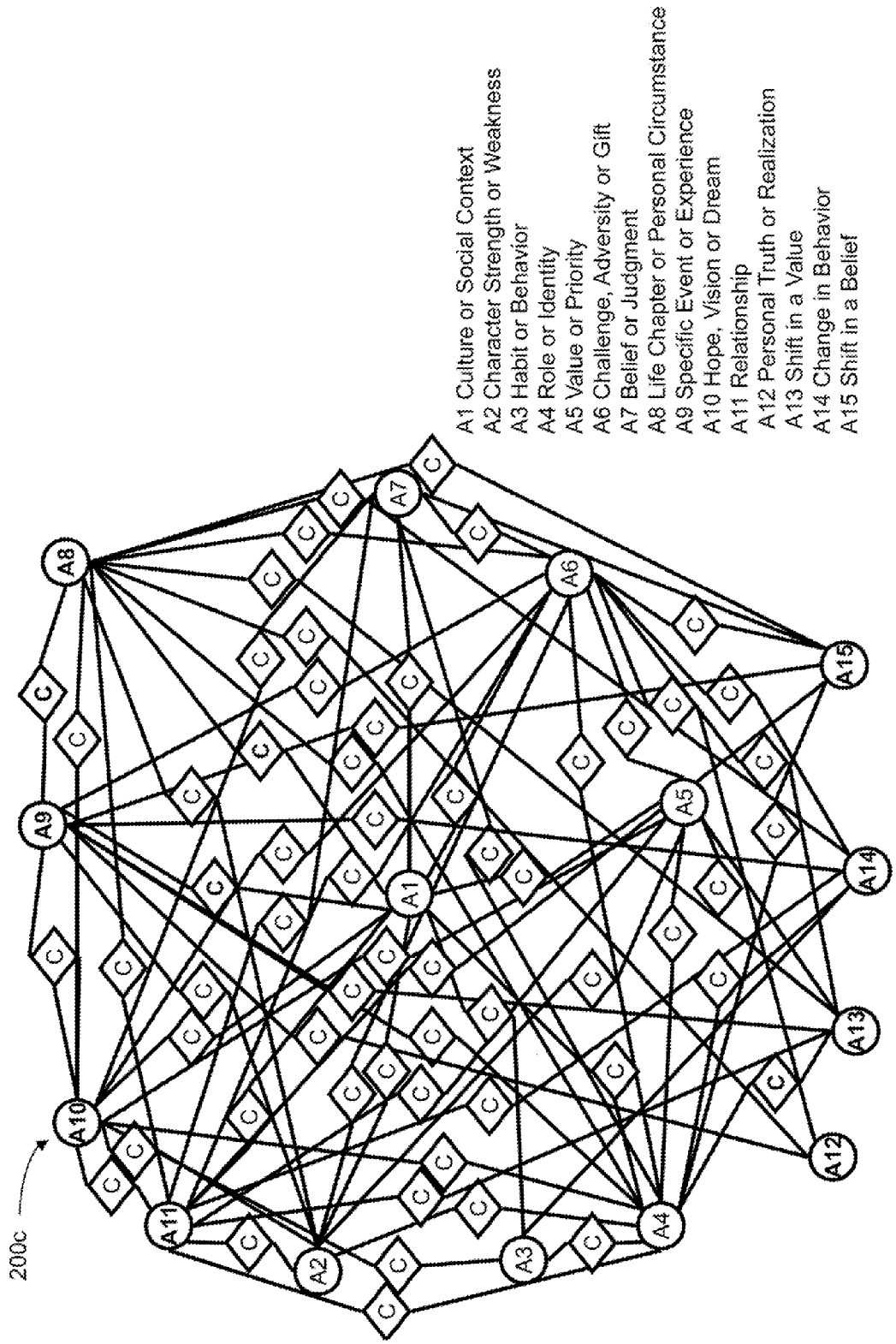
FIG. 2c depicts an alternate example of a data structure for LAT and CT model.

FIG. 2c depicts an alternate example of a mental association model data structure 200c. In the example of FIG. 2a, the data structure 200c includes LATs A1 through A15 and CTs C1 through C65 (not labeled due to size constraints). In the example of FIG. 2c as in the data structure 200a and 200b, the LATs are coupled to other LATs either directly as in the A7 to A15 coupling or indirectly through CT couplings. In this example all CTs are only coupled to two different LATs, LATs can be coupled to any number of CTs, and LATs can only be coupled to other LATs using a one-to-many relationship so that one LAT is an 'aggregating' LAT and the other would necessarily be an 'aggregated' LAT. Creation of an aggregated LAT instance requires the connection of an aggregating LAT instance, but the reverse is not true. CTs require the connection of two LATs. LATs do not require the connection of any CTs. LATs cannot connect to themselves directly.

In mental association model data structure 200c, the LATs represent characterization of aspects of life that are 'introspectively available' meaning that a user can answer questions about that aspect of life and 'meaningful' meaning that an instance of that aspect of life from the users personal experience is important or significant such that discoveries through personal enquiry would hold value. And the CTs represent connections between them that are also introspectively available, meaning the user can answer questions about the connection, and meaningful, meaning the connections between two meaningful aspect of life instances from the users personal experience are important or significant such that discoveries through personal enquiry would hold value.

Each LAT in a mental association model data structure has a unique set of questions associated with defined earlier as a LAT-QT set. Each CT in a mental association model data structure also has a unique set of questions associated with defined earlier as a CT-QT set. The LAT-QT set includes questions that pertain directly to that LAT as well as a question for each nearest neighbor CT whose answer results in the creation of LAIs and CIs or 'LAT-QT connect questions' and a question for each nearest neighbor aggregated LAT or 'LAT-QT aggregating questions'. The CT-QT set has a set of questions that ask about the relationship between its two connected LAT types.

The LAT-QT questions and the CT-QT questions have a subset of questions used to control presentation of future questions or "LAT-QT describe" questions (and answers) and "CT-QT describe" questions (and answers) respectively. The "QT describe" answers may include boolean, numeric, date, and enumeration information that can be used to control the traversal of a tree of potential future QT questions, as well as what LAIs or CIs are included in prompts, how they are presented to users in views, and how they are searched for.

Because every connection in a mental association model data structure is bi-directional, for every LAT-QT connect question resulting in a connection between (for example) LAT-A and an LAT-B resulting in new instances of LAT-B, there will be an LAT-QT connect question 'inverse question' which captures the same meaning but results in new instances of LAT-B. For example, if LAT-QT connect question includes the question "Which instances of LAT-B have been affected by this instance of LAT-A?" resulting in new instance of LAT-B and the CI between them, the LAT-QT connect question 'inverse question' would be "Which instances of LAT-A have been affecting this instance of LAT-B?" resulting in new instance of LAT-A and the CI between them.

FIG. 3a depicts an example 300a of a LAT-QT set using a data structure 200a based on LAT-A1 In the example 3a a LAT-QT set may include all nearest neighbors CTs {C1, C2, C3, C4} and the related LATs to the related CTs {A2, A3, A5}. The coverage also includes all the included CTs corresponding CT-QTs.

FIG. 3b depicts an example 300b of a LAT-QT set using a data structure 200a based on LAT-A2. In the example 3b a LAT-QT set may include all nearest neighbors CTs (C1, C5) and the related LATs to the related CTs (A1, A3). The coverage also includes all the included CTs corresponding CT-QTs.

FIG. 3c depicts an example 300c of a LAT-QT set using a data structure 200a based on LAT-A3. In the example 3c a LAT-QT set may include all nearest neighbors aggregating or aggregated LATs {A4} and CTs {C2, C5} and the related LATs to the related CTs {A1, A2, A4}. The coverage also includes all the included CTs corresponding CT-QTs.

FIG. 3d depicts an example 300d of a LAT-QT set using a data structure 200a based on LAT-A4. In the example 3d a LAT-QT set may include all nearest neighbors aggregating or aggregated LATs {A3} and CTs {C3, C6, C7} and the related LATs to the related CTs {A1, A3, A5}. The coverage also includes all the included CTs corresponding CT-QTs.

FIG. 3e depicts an example 300e of a LAT-QT set using a data structure 200a based on LAT-A5. In the example 3e a LAT-QT set may include all nearest neighbors CTs {C4, C6, C7} and the related LATs to the related CTs (A1, A4). The coverage also includes all the included CTs corresponding CT-QTs.

Figure 3F:
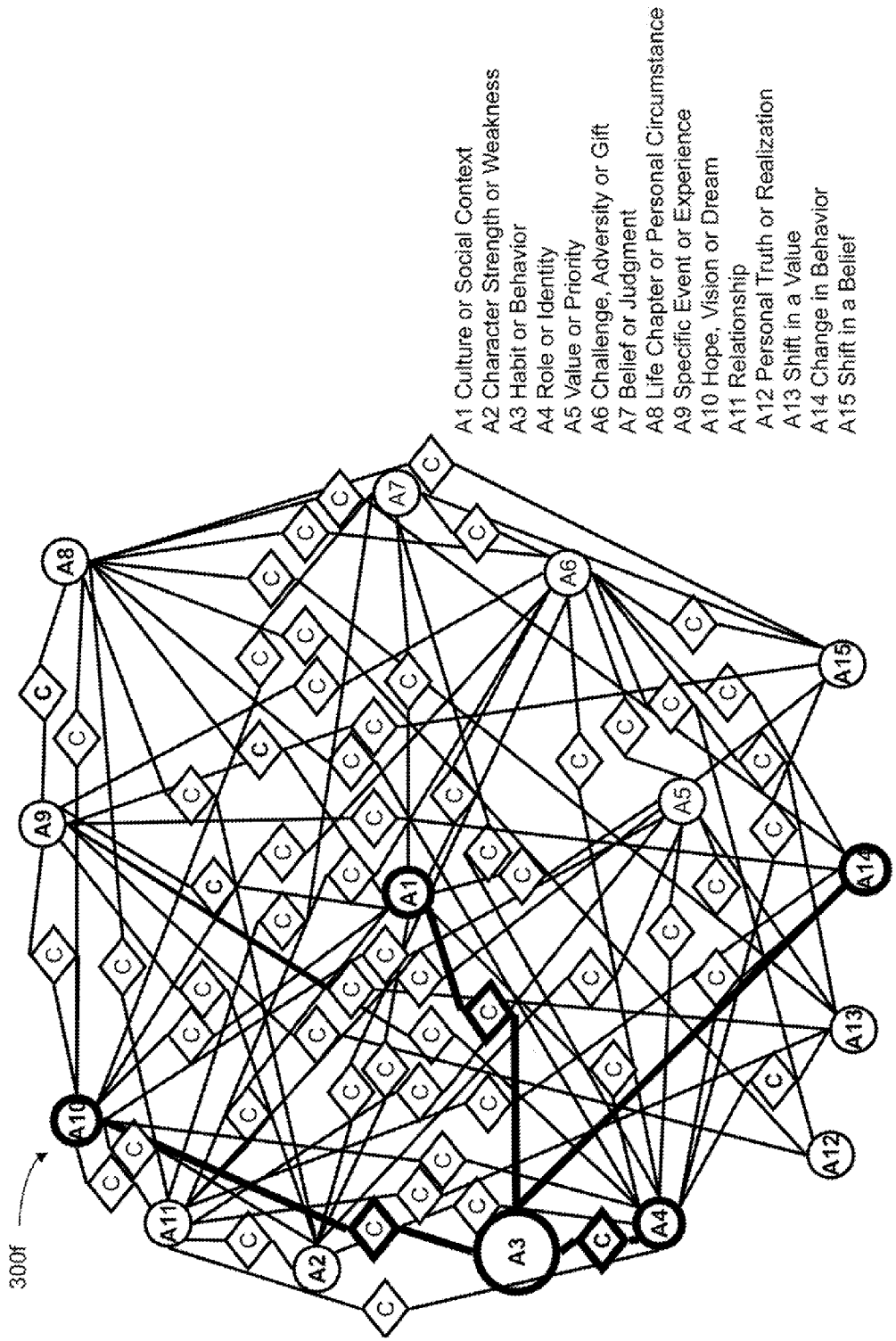
FIG. 3f depicts an alternate example of the data structure QT set 300 for LAT A5 based on the FIG. 2c example of a data structure for LAT and CT model.

FIG. 3f depicts an example 300f a LAT-QT set using a data structure 200c based on LAT-A3 Habit or Behavior. In the example 3f a LAT-QT set may include all nearest neighbors LATs {aggregated LAT Change in Behavior}, all CTs {CT—coupled to A1 Culture or Social Context, CT—coupled to A4 Role or Identity, CT—coupled to A10 Hope, Vision or Dream} and all the related LATs to the related CTs {A1 Culture or Social Context, A4 Role or Identity, A10 Hope, Vision or Dream}. In the example 3f the coverage also includes all the included CTs corresponding CT-QTs.

In the embodiment of FIG. 3f example 300f of a LAT-QT set, any individual LAT-QT can include a variety of question template forms, including but not limited to, collections of strings used for help text, description, personal account section headings and enquiry questions including the use of LAT-QT describe answers from the basis LAT (A3 Habit or Behavior), CT-QT describe answers for any related C's and LAT-QT and describe answers for any related LATs as tokens. The strings may also be selected or modified based on LAT-QT and CT-QT describe answers that are boolean or enumerations to control the grammar such as tense, tone or inclusion of the strings.

Tokens may include labels for instances that the user provide to provide context and familiarity to the questions. In the following examples X is a label given to an LAI instance 'from instance', in this example a label of an instance of A3 Habit or Behavior is "waking up late", and Y is a label of a related LAI instance 'to instance', in the following examples a label on instance of an A10 Hope, Vision or Dream is "becoming an Olympic athlete".

As used in this paper, "qualified and rendered" in reference to a QT refers to the QT passing all rules based criteria to be presented to the user (qualified), and applying all rules and token substitution based on LAT-QT and CT-QT describe answers that are boolean or enumerations to control the grammar such as tense, tone or inclusion of the strings to achieve a final form that is presented to the user (rendered).

The LAT-QTs or CT-QTs may cover a variety of mental retrieval modes or 'question types'. An example of a question type may be a "narration" as an invitation to simple story telling, for example "describe the behavior X" or "describe the behavior 'waking up late'" as an example of an LAT-QT or "Describe how 'sleeping in late' influenced 'becoming an Olympic athlete'." As an example of a CT-QT.

Another example of a question type may be an "expression" as an invitation to the recognition and expression of thoughts, feelings and sensations for example "what is X like", or "what is 'waking up late' like?" as an example of an LAT-QT or "How did it feel to 'sleep in late' while trying to realize 'becoming an Olympic athlete'?" an example of a CT-QT.

Another example of a question type may be a "reflection" as an invitation to look for patterns and connections for example "What (A3) Habit or Behaviors have been helped or hurt 'becoming an Olympic athlete'?" as an example of an LAT-QT connect question that results in the creation or connection of CIs and LAIs or as an example of the 'inverse question' "What (A10) hopes dreams or visions have been helped or hurt by 'sleeping in late'?" as another example of an LAT-QT connect question resulting in the creation of CIs and LAIs.

Other examples of a question type may be "musing" as an invitation to apply imagination or "speaking to things" as an invitation to view and address an LAI from different subjective perspectives for example "Does the person you are now have anything to say regarding the (A3) habit or behavior of 'sleeping in late'?" as an example of an LAT-QT or "Does the person you are now have anything to say to the person you were when you where when you had the (A10) hope, vision or dream of 'becoming an Olympic athlete'?" as another example of an LAT-QT.

A question template or QT may also include but is not limited to additional related information to the LAIs and CIs such as further instructions, help text, reminders etc. and any of these may also use the tokens mentioned above as well as logic from the QT describe answers in controlling wording and presentation.

When the user is answering LAT-QT questions that result in the generation of LAIs and CIs as answers, these instances are referred to as created 'on the fly' and result in the growing of LAI and CI graphs. 'On the fly creation' can happen a variety of ways.

Figure 4B:
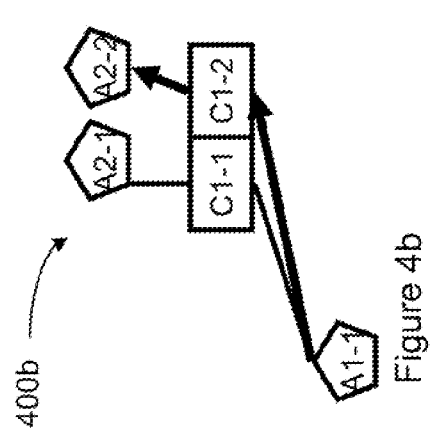
FIG. 4b depicts an example of a data structure for user LAIs and CIs resulting from 'On the fly' creation of new LAI A2-2 via creation of new CI C1-2 using FIG. 2a. example model via FIG. 3a A1 QT set question A1 to A2 via C1 repeatedly.
Figure 4D:
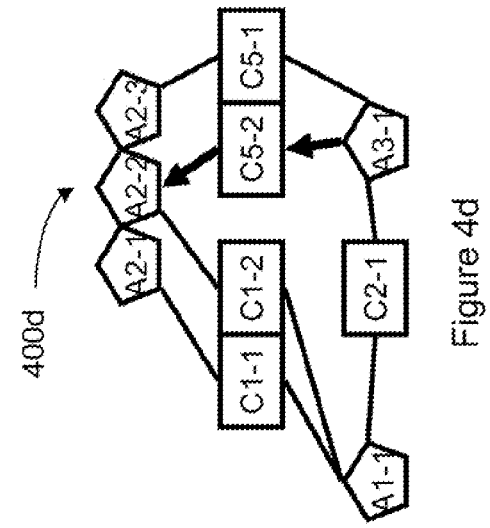
FIG. 4d depicts an example of a data structure for user LAIs and CIs resulting from connecting existing LAIs via creation of new CIs.
Figure 4A:
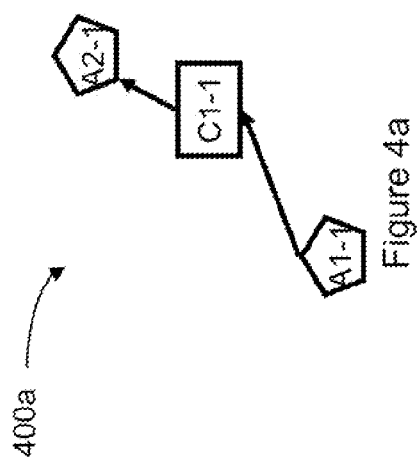
FIG. 4a depicts an example of a data structure for user LAIs and CIs resulting from 'On the fly' creation of new life aspect instance A2-1 via creation of new connection instance C1-1.

FIG. 4a depicts an example of a LAI and CI graph data structure 400a with an arrangement of user LAIs and CIs resulting from 'On the fly' creation of new life aspect instance A2-1 via creation of new connection instance C1-1 resulting in the extension of a user LAI and CI graph.

FIG. 4b depicts an example of a LAI and CI graph data structure 400b with an arrangement of LAIs and CIs resulting from 'On the fly' creation of new LAI A2-2 via creation of new CI C1-2 using FIG. 2a. example model via FIG. 3a A1 QT set question A1 to A2 via C1 repeatedly, resulting in the extension of a user LAI and CI graph.

Figure 4C:
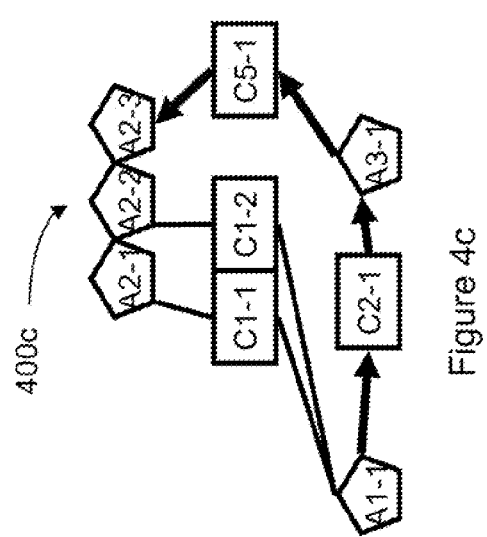
FIG. 4c depicts an example of a data structure for user LAIs and CIs resulting from switching to 'explore' newly created CIs and LAIs created 'on the fly'.

FIG. 4c depicts an example of a LAI and CI graph data structure 400c with an arrangement of user LAIs and CIs resulting from switching to 'explore' newly created CIs and LAIs created 'on the fly'. User creates C2-l and A3-1 via QT set (FIG. 3a) question addressing A1 to A3 via C2 using A1-1. User switches to answer QT set questions based on A3 (FIG. 3c) using A3-1. User creates C5-1 and A3-3 via A3 QT set question addressing A3 to A2 via C51 resulting in the extension of a user LAI and CI graph.

FIG. 4d depicts an example of a LAI and CI graph data structure 400d with an arrangement of user LAIs and CIs resulting from connecting existing LAIs via creation of new CIs. User answers QT set questions based on A3 (FIG. 3c) using A3-1. User is prompted with existing instances of A2. User selects A2-2 and creates C5-2 connecting existing A2-2 to A3-1 via A3 QT set question addressing A3 to A2 via C51 resulting in the extension of a user LAI and CI graph.

Figure 4E:
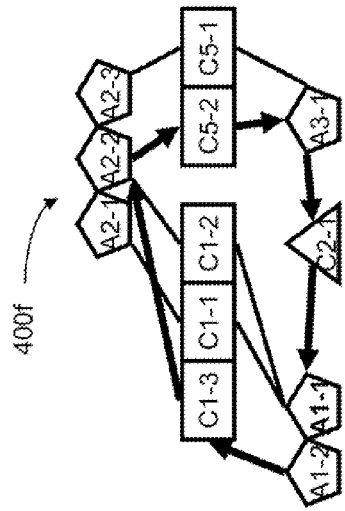
FIG. 4e depicts an example of a data structure for user LAIs and CIs resulting from bi-directional CI and LAI creation based on inverse QT set questions referring to the same model connection from each direction.

FIG. 4e depicts an example of a LAI and CI graph data structure 400e with an arrangement of user LAIs and CIs resulting from bi-directional CI and LAI creation based on inverse QT set questions referring to the same model connection from each direction. User answer QT set questions based on A2 (FIG. 3b) using A2-2 addressing A2 to A1 via C1. QT question includes inverse but consistent wording and instructions to QT set questions based on A1 (FIG. 3a) A1 to A2 via C1. User creates C1-3 and A1-21 resulting in the generation of a user LAI and CI graph.

Figure 4F:
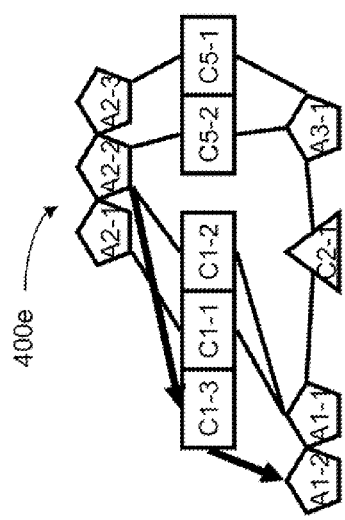
FIG. 4f depicts an example of a data structure for user LAIs and CIs resulting from reversing 'Train of Thought' using stored 'train of thought'.

FIG. 4f depicts an example of a LAI and CI graph data structure 400f with an arrangement of user LAIs and CIs resulting from reversing 'Train of Thought' using stored 'train of thought'. User views stored 'train of thought' to select a reverse process traversing A1-2 to C1-3 to A2-2 to C5-2 to A3-1 to C2-1 to A1-1. User answers QT set questions based on A1 (FIG. 3a) using A1-1.

Figure 4G:
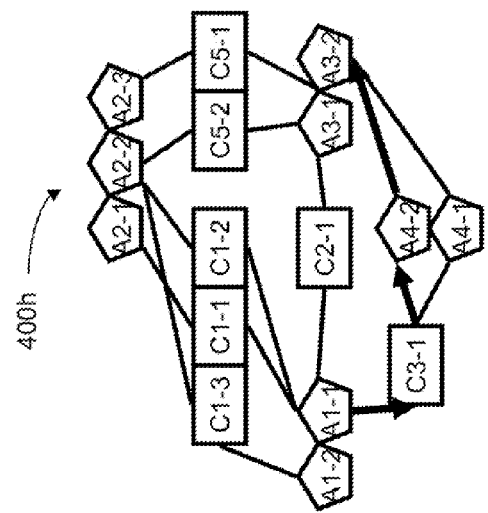
FIG. 4g depicts an example of a data structure for user LAIs and CIs resulting from creating aggregating LAI connection via aggregating LAI creation.

FIG. 4g depicts an example of a LAI and CI graph data structure 400g with an arrangement of user LAIs and CIs resulting from creating aggregating LAI connection via aggregating LAI creation. When creating an aggregated LAT (A4) either an aggregating LAT (A3) must be connected or one must be created and connected. In this example the Creation of A4-1 results in the creation of A3-2 for aggregating A4-1 via QT set questions based on A1 (FIG. 3a) using A1-1 based on model A1 to C3 to A4 1 resulting in the extension of a user LAI and CI graph.

Figure 4H:
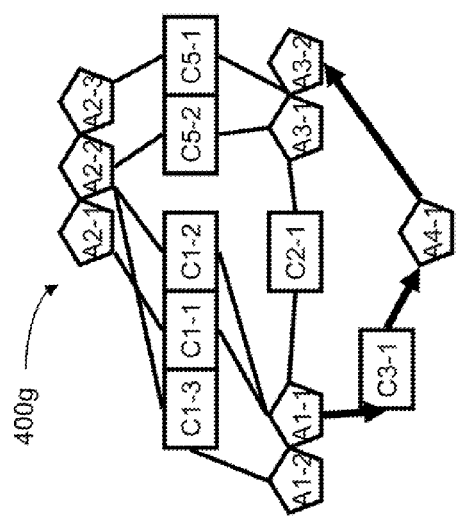
FIG. 4h depicts an example of a data structure for user LAIs and CIs resulting from aggregating LAI connection via existing aggregating LAI selection.

FIG. 4h depicts an example of a LAI and CI graph data structure 400h with an arrangement of user LAIs and CIs resulting from aggregating LAI connection via existing aggregating LAI selection. When creating an aggregated LAT (A4) either an aggregating LAT (A3) must be connected or one must be created and connected. In this example the Creation of A4-2 included connecting to existing A3-2 for aggregating A4-2 via QT set questions based on A1 (FIG. 3a) using A1-1 based on model A1 to C3 to A4 1 resulting in the generation of a user LAI and CI graph.

FIG. 4i depicts an example of a LAI and CI graph data structure 400i with an arrangement of user LAIs and CIs resulting from aggregating LAI connection via existing aggregating LAI selection. Connection of A3-2 for aggregating and creation of A4-2 via QT set questions based on A3 (FIG. 3c) using A3-2 based on model A3 to A41 resulting in the extension of a user LAI and CI graph.

Figure 5:
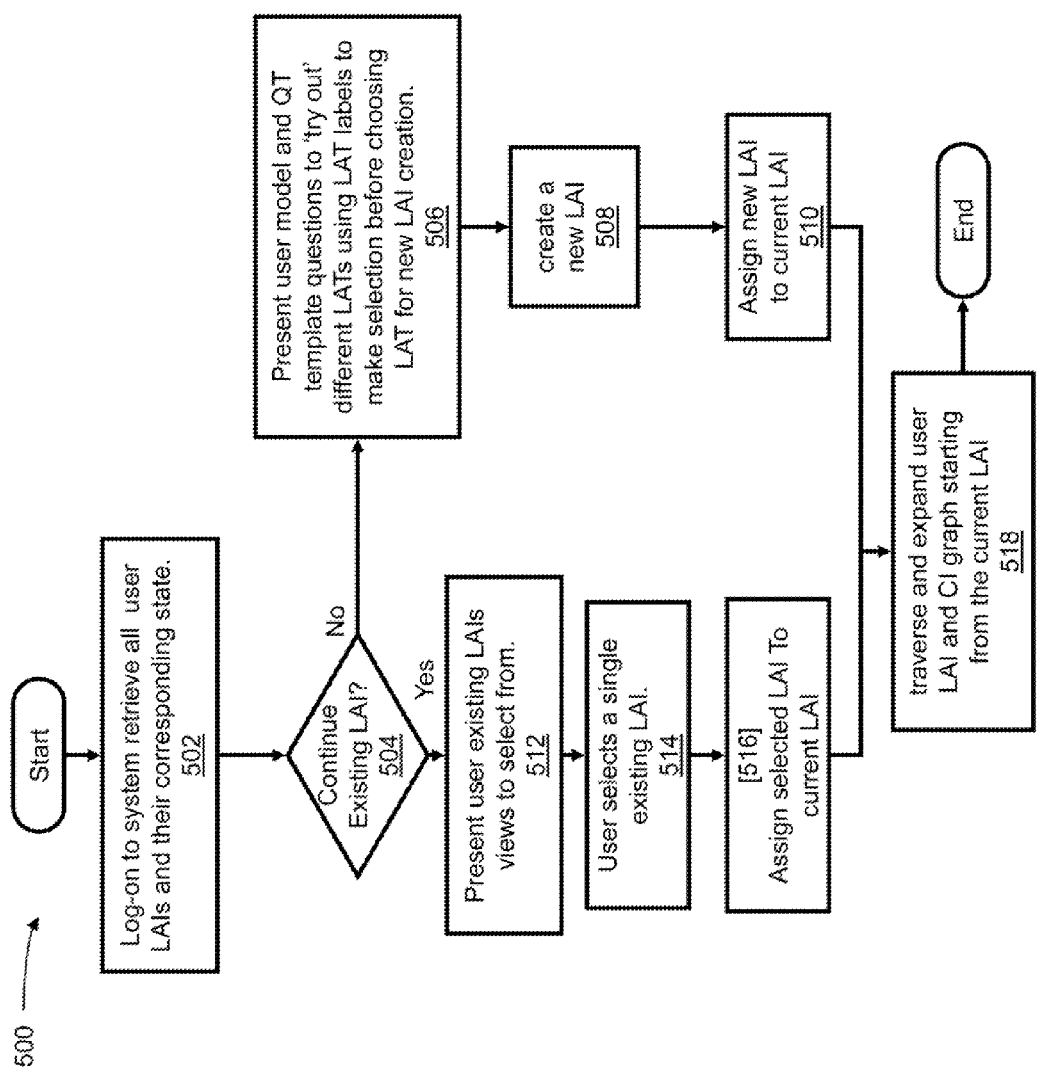
FIG. 5 depicts a flowchart of an example of a method for initiating, exploring and creating an LAI and CI graph.

FIG. 5 depicts a flowchart of an example of a method 500 for initiating, exploring and creating user LAI and CI graphs. The method is organized as a sequence of modules in the flowchart 500. However, it should be understood that these and other modules associated with other methods described herein may be reordered for parallel execution or into different sequences of modules.

In the example of FIG. 5, the flowchart starts at module 502 with Log-on to system retrieve all user LAIs and their corresponding state. State information may include but is not limited to, when it was last updated, its associated 'train of thought' and the last question answered, is it the last LAI the user engaged or the 'current LAI', and what relationship is it to the 'current LAI'.

In the example of FIG. 5, the flowchart continues to decision module 504 with prompting the user to continue existing LAI. If the decision at 504 is no, then the flowchart proceeds to module 506, alternatively, if the decision at 504 is yes, the flowchart proceeds to module 512.

In the example of FIG. 5, the flowchart continues from decision module 504 to module 506 with presenting the user model and QT template questions to 'try out' different LATs using LAT labels to make selection before choosing LAT for new LAI creation. The user may first choose a LAT from a list or from representative questions, then next may specify labels for an LAI that is used in the LAT-QTs to generate sample questions without persisting the LAI to the user data repository. They repeat this process until they find a LAT-QT set with a label that they like.

In the example of FIG. 5, the flowchart continues to module 508 with create a new LAI. This LAI is based on the selected LAT from the last step.

In the example of FIG. 5, the flowchart continues to module 510 with assigning new LAI to current LAI. This state is persisted for retrieval on next log-in.

In the example of FIG. 5, the flowchart continues from decision module 504 to module 512 with presenting the user existing LAIs views to select from. Views facilitate the user choosing which existing LAI they wish to engage and may allow selection by LAT category, by last edited, by 'trains of thought', by related to last edited, by time etc.

In the example of FIG. 5, the flowchart continues to module 514 with user selecting a single existing LAI.

In the example of FIG. 5, the flowchart continues to module 516 with assigning selected LAI To current LAI.

In the example of FIG. 5, the flowchart continues from either module 516 or module 510 to module 518 with traversing and expanding user LAI and CI graph starting from the current LAI. Having traversed and expanded user LAI and CI graph starting from the current LAI, the flowchart terminates.

Figure 6:
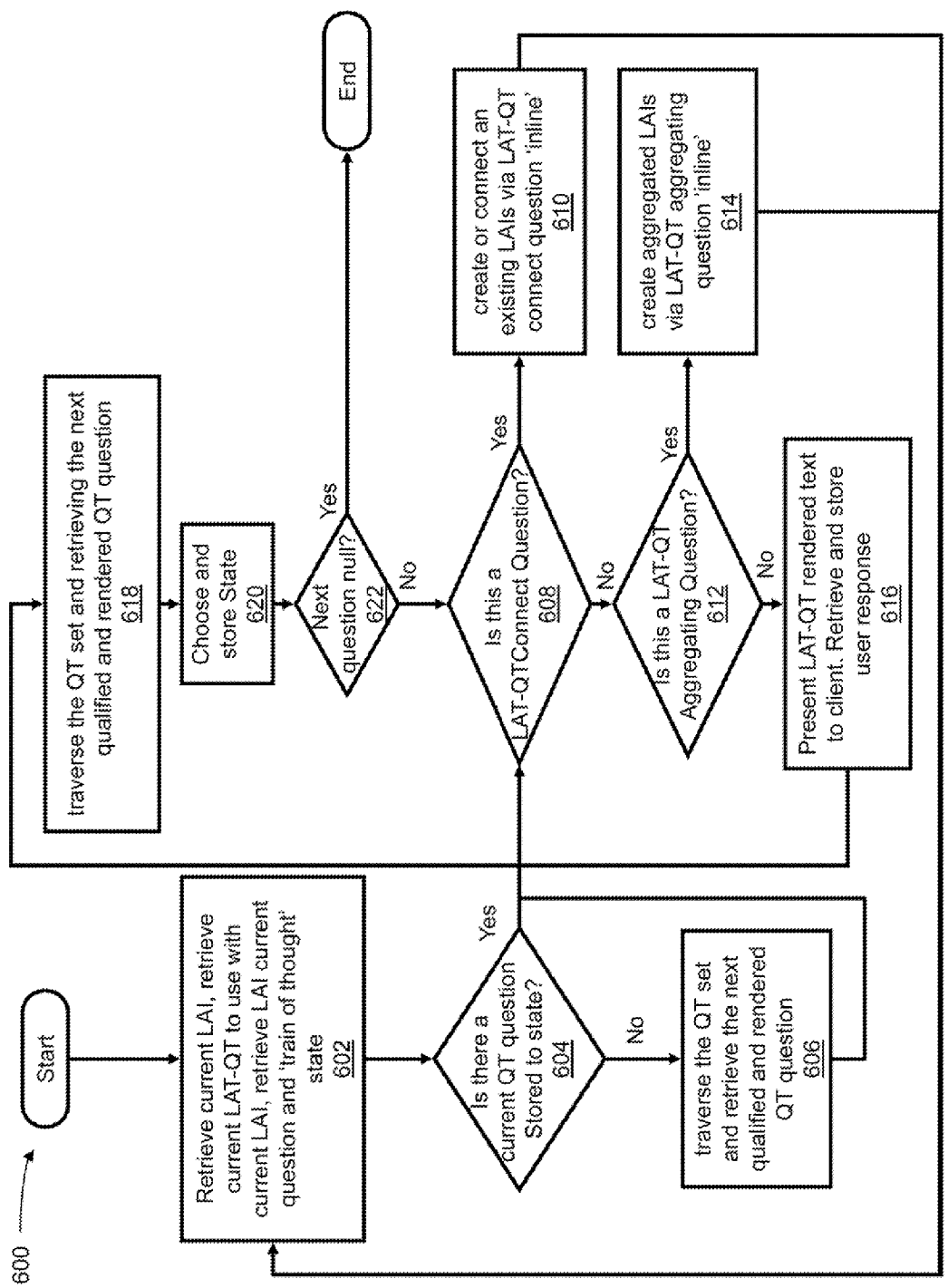
FIG. 6 depicts a flowchart of an example of a method for traversing and expanding user LAI and CI graph starting from a current LAI.

FIG. 6 depicts a flowchart of an example of a method 600 for traversing and expanding user LAI and CI graph starting from a current LAI. The method is organized as a sequence of modules in the flowchart 600. However, it should be understood that these and other modules associated with other methods described herein may be reordered for parallel execution or into different sequences of modules.

In the example of FIG. 6, the flowchart starts at module 602 with retrieving the current LAI, retrieving current LAT-QT to use with current LAI, retrieving LAI current question and 'train of thought' state. All data is retrieved from the user data repository via the interview engine.

In the example of FIG. 6, the flowchart also continues to module 602 from module 614 and module 610.

In the example of FIG. 6, the flowchart continues to decision module 604 with determining if there a current QT question stored to state. If the decision at 604 is no, then the flowchart proceeds to module 606, alternatively, if the decision at 604 is yes, the flowchart proceeds to module 608.

In the example of FIG. 6, the flowchart continues from decision module 604 to module 606 with traversing the QT set and retrieving the next qualified and rendered QT question. This question becomes the current QT question stored to state.

In the example of FIG. 6, the flowchart continues from decision module 604 or from module 606 to decision module 608 with determining if this a LAT-QT connect question. If the decision at 608 is no, then the flowchart proceeds to decision module 612, alternatively, if the decision at 608 is yes, the flowchart proceeds to module 610.

In the example of FIG. 6, the flowchart continues from decision module 608 to module 610 with creating or connecting an existing LAIs via LAT-QT connect question 'inline', The created or connected LAI is the response or the LAT-QT answer to the LAT-QT connect question.

In the example of FIG. 6, the flowchart continues from decision module 608 to decision module 612 with determining if this a LAT-QT aggregating question. If the decision at 612 is no, then the flowchart proceeds to module 616, alternatively, if the decision at 612 is yes, the flowchart proceeds to module 614.

In the example of FIG. 6, the flowchart continues from decision module 612 to module 614 with creating aggregated LAIs via LAT-QT aggregating question 'inline'. The created LAI is the response or LAT-QT answer to the LAT-QT aggregating question.

In the example of FIG. 6, the flowchart continues from decision module 612 to module 616 with presenting LAT-QT rendered text to client. The rendering includes substituting tokens into LAT-QT templates and may be a part of a larger response from the user interview engine that includes and is not limited to other forms of information from the mental association model metadata such as images and sounds.

In the example of FIG. 6, the flowchart continues to module 618 with traversing the QT set and retrieving the next qualified and rendered QT question.

In the example of FIG. 6, the flowchart continues to module 620 with choosing and storing state. This is the state for the current LAI.

In the example of FIG. 6, the flowchart continues to decision module 622 with determining if the next question is null. If the decision at 622 is no, then the flowchart proceeds to module 608, alternatively, if the decision at 622 is yes, the flowchart terminates.

Figure 7:
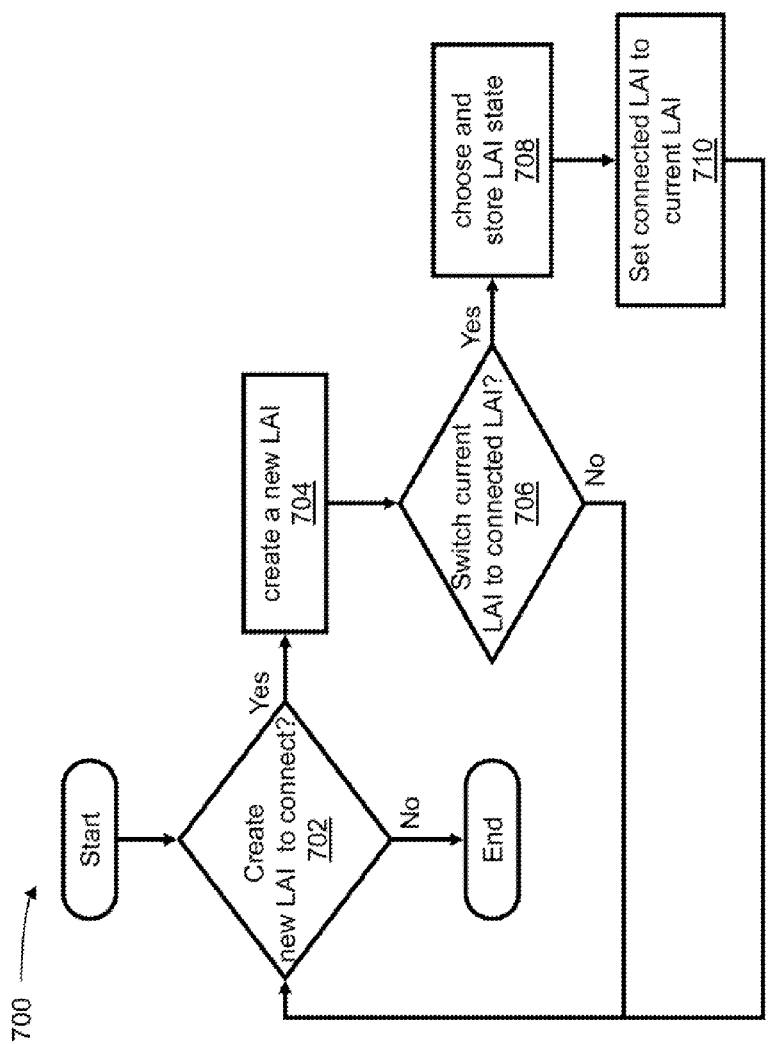
FIG. 7 depicts a flowchart of an example of a method for creating aggregated LAIs via LAT-QT aggregating question 'inline'.

FIG. 7 depicts a flowchart of an example of a method 700 for creating aggregated LAIs via LAT-QT aggregating question 'inline'. The method is organized as a sequence of modules in the flowchart 700. However, it should be understood that these and other modules associated with other methods described herein may be reordered for parallel execution or into different sequences of modules.

In the example of FIG. 7, the flowchart starts at decision module 702 with prompting the user to determine if they want to create a new LAI to connect. This prompting is via an LAT_QT connect question connecting an aggregating LAT to an aggregated LAT. If the decision at 702 is no, the flowchart terminates, alternatively, if the decision at 702 is yes, the flowchart proceeds to module 704.

In the example of FIG. 7, the flowchart also continues to module 702 from decision module 706 and module 710.

In the example of FIG. 7, the flowchart continues from decision module 702 to module 704 with creating a new LAI.

In the example of FIG. 7, the flowchart continues to decision module 706 with prompting the user to determine if they want to switch current LAI to the connected LAI. In switching the user then engages the LAT-Q set associated with the switched to connected LAI (via its type or LAT) instead of the LAT-QT set associated with the current LAIs (via its type or LAT). If the decision at 706 is no, then the flowchart proceeds to decision module 702, alternatively, if the decision at 706 is yes, the flowchart proceeds to module 708.

In the example of FIG. 7, the flowchart continues from decision module 706 to module 708 with choosing and storing the LAI state. The state stored is for both the current LAI and the switched to connected LAI.

In the example of FIG. 7, the flowchart continues to module 710 with setting the connected LAI to the current LAI.

Figure 8:
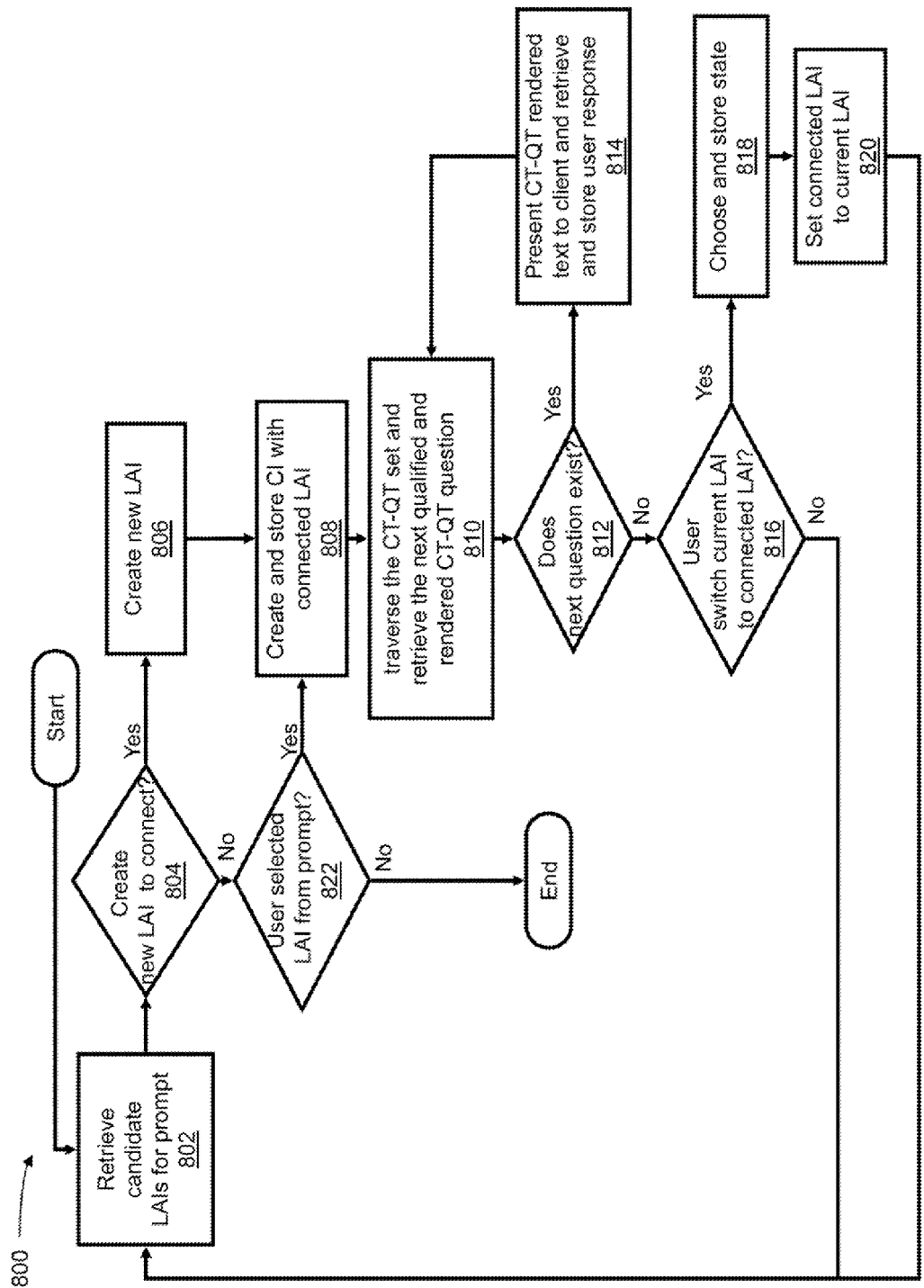
FIG. 8 depicts a flowchart of an example of a method for creating or connecting existing LAIs via LAT-QT connect question 'inline'.

FIG. 8 depicts a flowchart of an example of a method 800 for creating or connecting existing LAIs via LAT-QT connect question 'inline'. The method is organized as a sequence of modules in the flowchart 800. However, it should be understood that these and other modules associated with other methods described herein may be reordered for parallel execution or into different sequences of modules.

In the example of FIG. 8, the flowchart starts at module 802 with retrieving candidate LAIs for prompting the user. Candidate LAIs may be chosen in a variety ways including but not limited to, their type (LAT), when they happened in a person's life, how they are characterized that person using various enumerations and classifications etc.

In the example of FIG. 8, the flowchart also continues to module 802 from decision module 816 and module 820.

In the example of FIG. 8, the flowchart continues to decision module 804 with prompting the user to determine if they would like to create a new LAI to connect. If the decision at 804 is no, then the flowchart proceeds to module 822, alternatively, if the decision at 804 is yes, the flowchart proceeds to module 806.

In the example of FIG. 8, the flowchart continues from decision module 804 to module 806 with creating a new LAI.

In the example of FIG. 8, the flowchart continues to module 808 with creating and storing CI with connected LAI. This is persisted in the user data repository.

In the example of FIG. 8, the flowchart continues to module 810 with traversing the CT-QT set and retrieving the next qualified and rendered CT-QT question. These CT-QT questions now may include both connected instances labels and other information to render the question.

In the example of FIG. 8, the flowchart continues to decision module 812 with determining if the next question exists. If the decision at 812 is no, then the flowchart proceeds to module 816, alternatively, if the decision at 812 is yes, the flowchart proceeds to module 814.

In the example of FIG. 8, the flowchart continues from decision module 812 to module 814 with presenting CT-QT rendered text to client and retrieving and storing the user response. Retrieving and storing user response. The rendering includes substituting tokens into CT-QT templates and may be a part of a larger response from the user interview engine that includes and is not limited to other forms of information from the mental association model metadata such as images and sounds.

In the example of FIG. 8, the flowchart continues from decision 812 to decision module 816 with prompting the user if they want to switch current LAI to connected LAI. If the decision at 816 is no, then the flowchart proceeds to module 802, alternatively, if the decision at 816 is yes, the flowchart proceeds to module 818.

In the example of FIG. 8, the flowchart continues from decision 816 to module 818 with choosing and storing LAI state. The stored state is for both the switched to connected LAI and the current LAI.

In the example of FIG. 8, the flowchart continues to module 820 with setting connected LAI to current LAI.

In the example of FIG. 8, the flowchart continues from decision module 804 to decision module 822 with prompting user if they would like to connect existing LAI which are chosen from the set assembled in module 802. If the decision at 822 is no, then the flowchart terminates, alternatively, if the decision at 822 is yes, the flowchart proceeds to module 808.

Figure 9:
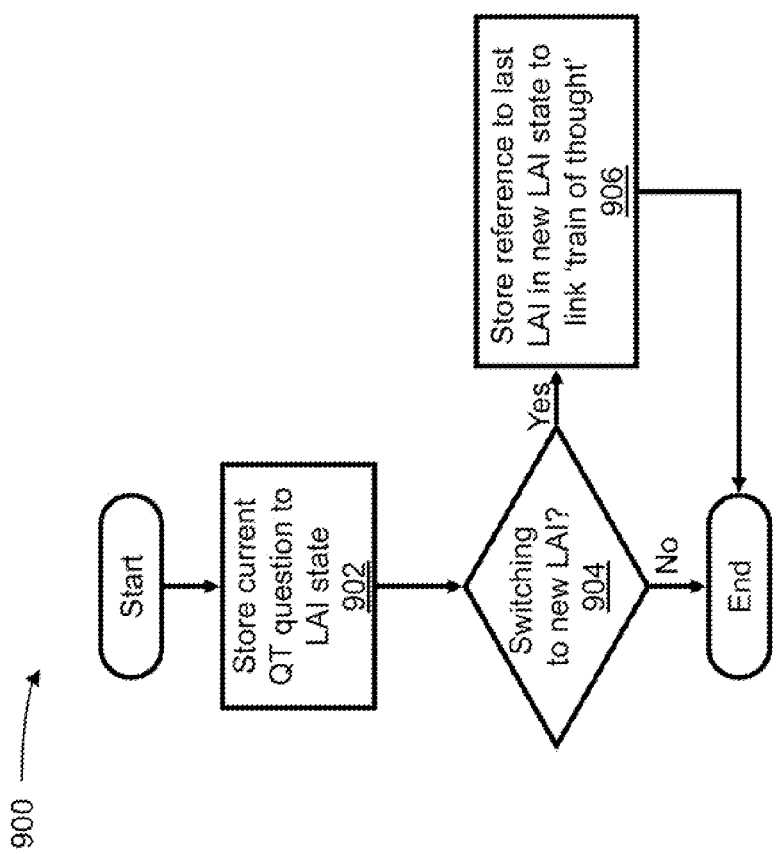
FIG. 9 depicts a flowchart of an example of a method for choosing and storing LAI state.

FIG. 9 depicts a flowchart of an example of a method 900 for choosing and storing LAI state. The method is organized as a sequence of modules in the flowchart 900. However, it should be understood that these and other modules associated with other methods described herein may be reordered for parallel execution or into different sequences of modules.

In the example of FIG. 9, the flowchart starts at module 902 with storing the current QT question to the current LAI state.

In the example of FIG. 8, the flowchart continues to decision module 904 with determining if the user is switching to new LAI. If the decision at 904 is no the flowchart terminates, alternatively, if the decision at 904 is yes, the flow chart proceeds to module 906.

In the example of FIG. 9, the flowchart continues from decision 904 to module 906 with storing a reference to the last LAI in the new LAI state to link the 'train of thought'. In this case the 'last' LAI is what was the 'current' LAI and the new LAI is the 'switched to'. Having stored a reference to the last LAI in the new LAI state to link the 'train of thought', the flowchart terminates.

Figure 10:
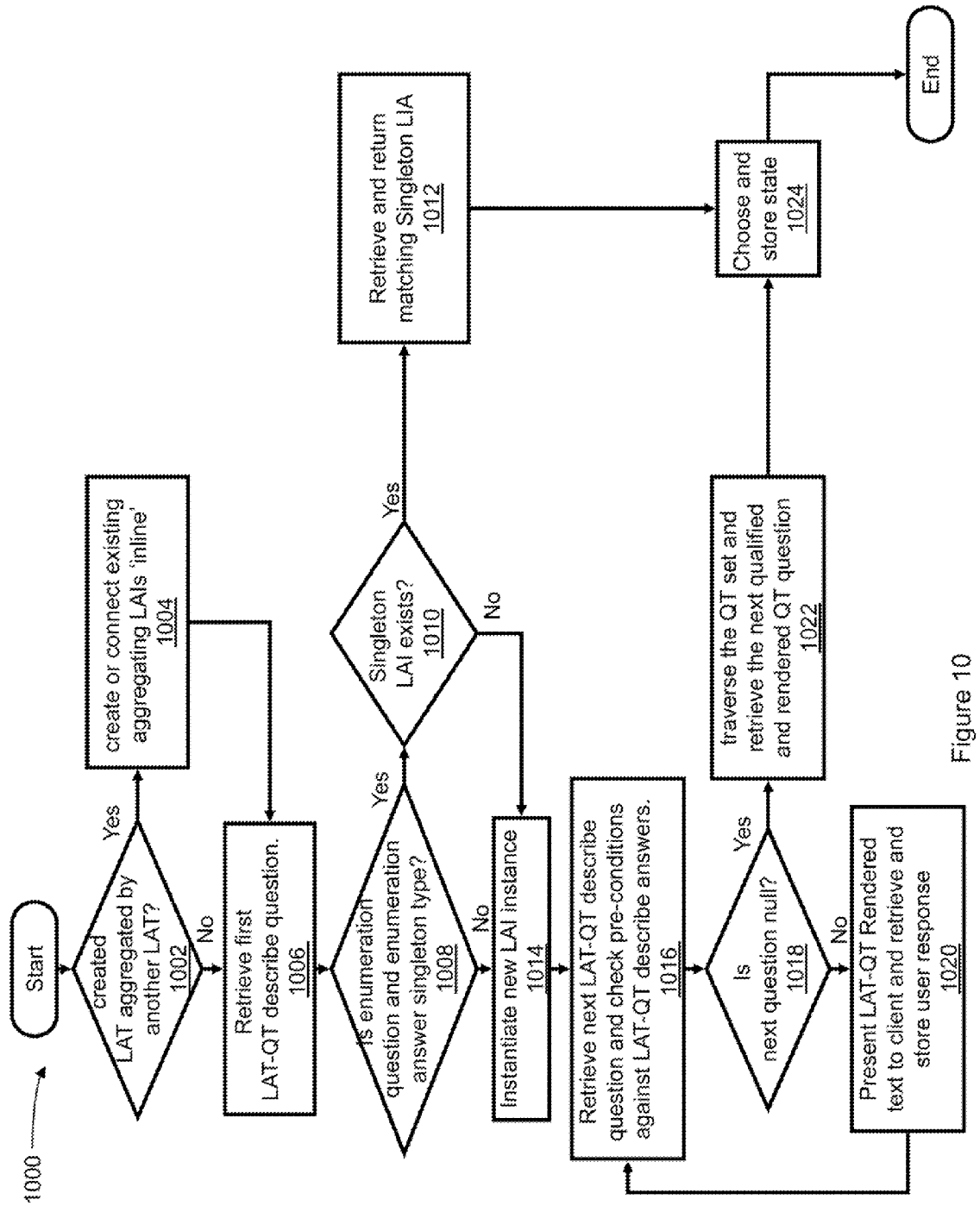
FIG. 10 depicts a flowchart of an example of a method for creating a new LAI.

FIG. 10 depicts a flowchart of an example of a method 1000 for creating a new LAI. The method is organized as a sequence of modules in the flowchart 1000. However, it should be understood that these and other modules associated with other methods described herein may be reordered for parallel execution or into different sequences of modules.

In the example of FIG. 10, the flowchart starts at decision module 1002 with determining if this created LAT is aggregated by another LAT. If the decision at 1002 is no, then the flowchart proceeds to module 1006, alternatively, if the decision at 1002 is yes, the flow chart proceeds to module 1004.

In the example of FIG. 10, the flowchart continues from decision module 1002 to module 1004 with creating or connecting existing aggregating LAIs 'inline'.

In the example of FIG. 10, the flowchart continues from either decision module 1002 or module 1004 to module 1006 with retrieving the first LAT-QT describe question.

In the example of FIG. 10, the flowchart continues to decision module 1008 with determining if this is an enumeration question and enumeration answer is a singleton type. If the decision at 1008 is no, then the flowchart proceeds to module 1014, alternatively, if the decision at 1008 is yes, the flow chart proceeds to decision module 1010.

In the example of FIG. 10, the flowchart continues from decision module 1008 to decision module 1010 with determining if singleton LAI exists. An example of a singleton type may be an entities such as 'myself' or 'death'. If the decision at 1010 is no, then the flowchart proceeds to module 1014, alternatively, if the decision at 1010 is yes, the flow chart proceeds to module 1012.

In the example of FIG. 10, the flowchart continues to module 1012 with retrieving and returning matching Singleton LIA. This may be done by searching the user instance repository for LAIs of matching type with the same characterization.

In the example of FIG. 10, the flowchart continues from either decision module 1008 or decision module 1010 to module 1014 with instantiating a new LAI instance.

In the example of FIG. 10, the flowchart continues from either module 1014 or module 1020 to module 1016 with retrieving the next LAT-QT describe question and checking pre-conditions against previous LAT-QT describe answers.

In the example of FIG. 10, the flowchart continues to decision module 1018 with determine if next question is null. If the decision at 1018 is no, then the flowchart proceeds to module 1020, alternatively, if the decision at 1018 is yes, the flow chart proceeds to module 1022.

In the example of FIG. 10, the flowchart continues from decision module 1018 to module 1020 with presenting the LAT-QT rendered text to client and retrieving and storing the users response. Retrieving and storing user response. The rendering includes substituting tokens into LAT-QT templates and may be a part of a larger response from the user interview engine that includes and is not limited to other forms of information from the mental association model metadata such as images and sounds.

In the example of FIG. 10, the flowchart continues from decision module 1018 to module 1022 with traversing the QT set and retrieving the next qualified and rendered QT question. These questions are distinct from the previous LAT-QT describe questions as they are not used for characterizing the LAI.

In the example of FIG. 10, the flowchart continues from either decision module 1012 or module 1022 to module 1024 with choosing and storing state. This state is for this newly created LAI. Having chosen and stored state, the flowchart terminates.

Figure 11:
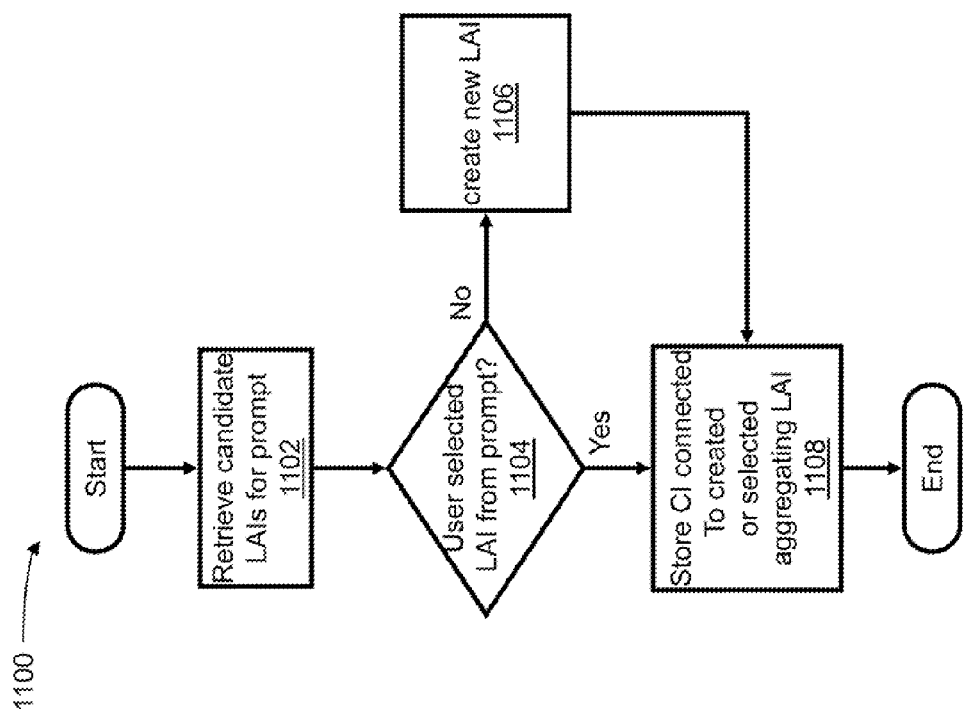
FIG. 11 depicts a flowchart of an example of a method for creating or connecting existing aggregating LAIs 'inline'.

FIG. 11 depicts a flowchart of an example of a method 1100 for creating or connecting existing aggregating LAIs 'inline'. The method is organized as a sequence of modules in the flowchart 1100. However, it should be understood that these and other modules associated with other methods described herein may be reordered for parallel execution or into different sequences of modules.

In the example of FIG. 11, the flowchart starts at module 1102 with retrieving candidate LAIs for prompting the user. This is done by retrieving all the existing LAIs for this user of the aggregating LAT and filtering by any criteria supplied by LAT-QT describe answers for the aggregated LAT.

In the example of FIG. 11, the flowchart continues to decision module 1104 with user selecting LAI from the prompt. If the decision at 1104 is no, then the flowchart proceeds to module 1106, alternatively, if the decision at 1104 is yes, the flow chart proceeds to module 1108.

In the example of FIG. 11, the flowchart continues from decision module 1104 to module 1106 with creating a new LAI.

In the example of FIG. 11, the flowchart continues from decision module 1104 or module 1106 to module 1108 with storing CI connecting created or selected aggregating LAI. Having stored the connection to the created or selected aggregating LAI, the flowchart terminates.

Figure 12:
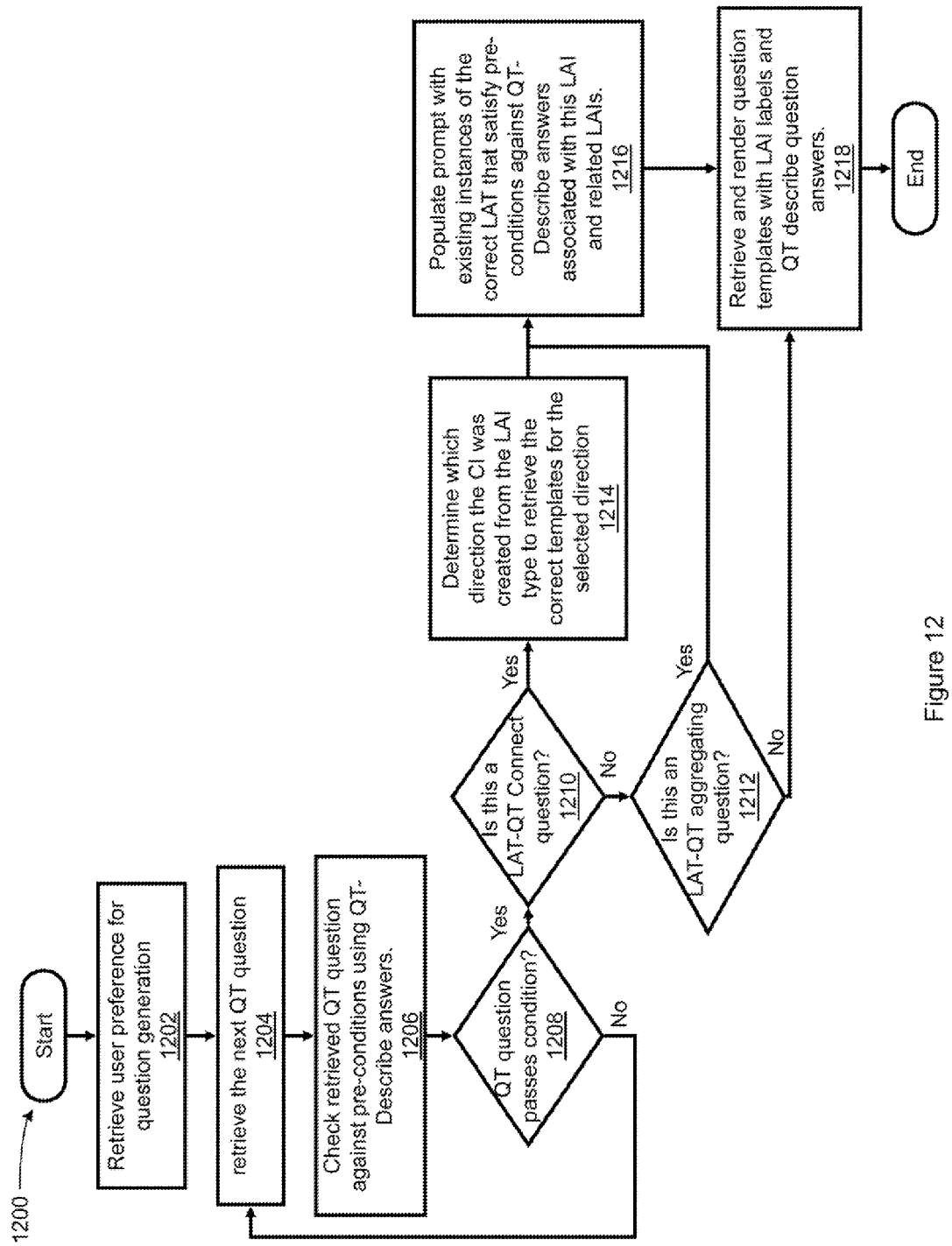
FIG. 12 depicts a flowchart of an example of a method for traversing a QT set and retrieving a next qualified and rendered QT question.

FIG. 12 depicts a flowchart of an example of a method 1200 for traversing a QT set and retrieving a next qualified and rendered QT question. The method is organized as a sequence of modules in the flowchart 1200. However, it should be understood that these and other modules associated with other methods described herein may be reordered for parallel execution or into different sequences of modules.

In the example of FIG. 12, the flowchart starts at module 1202 with retrieving the users preference for question generation. The user be given various options for how to be presented questions. They may also be given options that allow them to filter based on question type.

In the example of FIG. 12, the flowchart continues to from module 1202 or decision module 1208 to module 1204 with retrieving the next QT question. This will be based on the user preference specified in module 1202.

In the example of FIG. 12, the flowchart continues to module 1206 with check retrieved QT question against pre-conditions using the QT-describe answers.

In the example of FIG. 12, the flowchart continues to decision module 1208 with determine if QT question passes conditions. If the decision at 1208 is no, then the flowchart proceeds to module 1204, alternatively, if the decision at 1208 is yes, the flow chart proceeds to module 1210.

In the example of FIG. 12, the flowchart continues from decision module 1208 to decision module 1210 with determine if it is a LAT-QT Connect question. If the decision at 1210 is no, then the flowchart proceeds to decision module 1212, alternatively, if the decision at 1210 is yes, the flow chart proceeds to module 1214.

In the example of FIG. 12, the flowchart continues from decision module 1210 to decision module 1212 with determine if is an LAT-QT aggregating question. If the decision at 1212 is no, then the flowchart proceeds to module 1218, alternatively, if the decision at 1212 is yes, the flow chart proceeds to module 1216.

In the example of FIG. 12, the flowchart continues from decision module 1210 to module 1214 with determining which direction the CI was created from the LAI type to retrieve the correct templates for the selected direction. This refers to the 'inverse questions'.

In the example of FIG. 12, the flowchart continues from decision module 1212 or from decision module 1212 to module 1216 with populating prompt with existing instances of the correct LAT that satisfy pre-conditions against QT-describe answers associated with this LAI and related LAIs.

In the example of FIG. 12, the flowchart continues from decision module 1212 or decision module 1212 to module 1218 with retrieving and rendering question templates with LAI labels and QT describe question answers. Having retrieved and rendered question and help templates with LAI labels and QT describe question answers, the flowchart terminates.

Figure 13:
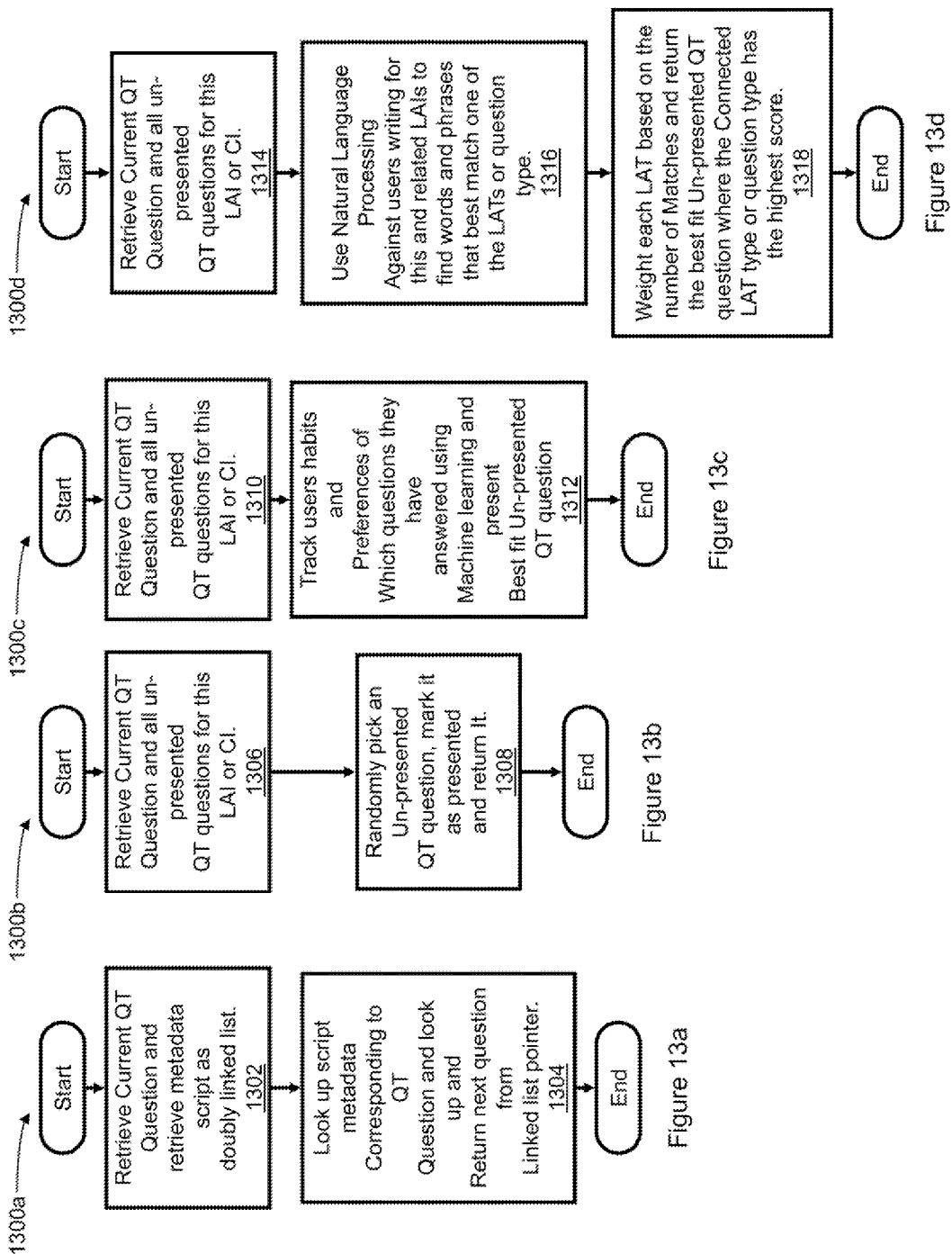
FIG. 13a depicts a flowchart of an example of a method for retrieving a next QT question using a simple doubly linked list.
FIG. 13b depicts a flowchart of an example of an alternate method for retrieving a next QT question from randomly choosing remaining un-presented questions.
FIG. 13c depicts a flowchart of an example of an alternate method for retrieving a next QT question from patterns of users past behavior of which questions they have answered.
FIG. 13d depicts a flowchart of an example of an alternate method for retrieving a next QT question from natural language processing of user writing to determine an optimal next question.

FIG. 13a depicts a flowchart of an example of a method 1300a for retrieving a next QT question using a simple doubly linked list. The method is organized as a sequence of modules in the flowchart 1300. However, it should be understood that these and other modules associated with other methods described herein may be reordered for parallel execution or into different sequences of modules.

In the example of FIG. 13a, the flowchart starts at module 1302 with retrieving the current QT Question and retrieving the metadata script as a doubly linked list. This structure allows the simple forward and backward traversal in a predetermined manner.

In the example of FIG. 13a, the flowchart continues to module 1304 with looking up script metadata corresponding to QT Question and looking up and returning the next question from the linked list pointer. Having looked up script metadata corresponding to QT Question and looked up and returned the next question from the linked list pointer, the flowchart terminates.

FIG. 13b depicts a flowchart of an example of an alternate method 1300b for retrieving a next QT question from randomly choosing remaining un-presented questions. The method is organized as a sequence of modules in the flowchart 1305. However, it should be understood that these and other modules associated with other methods described herein may be reordered for parallel execution or into different sequences of modules.

In the example of FIG. 13b, the flowchart starts at module 1306 with retrieving current QT question and all un-presented QT questions for this LAI or C. As questions are retrieved they are saved to state as being removed from a set of un-presented QT questions.

In the example of FIG. 13b, the flowchart continues to module 1308 with randomly picking an un-presented QT question, marking it as presented and returning it. QT questions are picked from a set of un-presented QT questions. Having randomly picked an un-presented QT question, marked it as presented and returning it, the flowchart terminates.

FIG. 13c depicts a flowchart of an example of an alternate method 1300c for retrieving a next QT question from patterns of users past behavior of which questions they have answered. The method is organized as a sequence of modules in the flowchart 1309. However, it should be understood that these and other modules associated with other methods described herein may be reordered for parallel execution or into different sequences of modules.

In the example of FIG. 13c, the flowchart starts at module 1310 with retrieving current QT question and all un-presented QT questions for this LAI or CI. As questions are retrieved they are saved to state as being removed from a set of un-presented QT questions.

In the example of FIG. 13c, the flowchart continues to module 1312 with tracking users habits and preferences of which questions they have answered using machine learning and present the best fit un-presented QT question. Habits and preferences may be based on LAT type, question type, mood of question or some other characterization of a QT questions. QT questions are picked from a set of un-presented QT questions. Having tracked users habits and preferences of which questions they have answered using machine learning and presented the best fit un-presented QT question, the flowchart terminates.

FIG. 13d depicts a flowchart of an example of an alternate method 1300d for retrieving a next QT question from natural language processing of user writing to determine an optimal next question. The method is organized as a sequence of modules in the flowchart 1300d. However, it should be understood that these and other modules associated with other methods described herein may be reordered for parallel execution or into different sequences of modules.

In the example of FIG. 13d, the flowchart starts at module 1314 with retrieving current QT question and all un-presented QT questions for this LAI or CI. As questions are retrieved they are saved to state as being removed from a set of un-presented QT questions.

In the example of FIG. 13d, the flowchart continues to module 1316 with using Natural Language Processing against users writing for this and related LAIs to find words and phrases that best match one of the LATs or question type. This may be done by matching the text of the QT templates or matching the actual words, associations to the words, emotional tone of the question or any other way that characterizes the QT templates, LATs or question types semantically.

In the example of FIG. 13d, the flowchart continues to module 1318 with weighting each LAT based on the number of matches and returning the best fit un-presented QT question where the Connected LAT type or question type has the highest score. Having weighted each LAT based on the number of matches and returned the best fit un-presented QT question where the Connected LAT type or question type has the highest score, the flowchart terminates.

Figure 14:
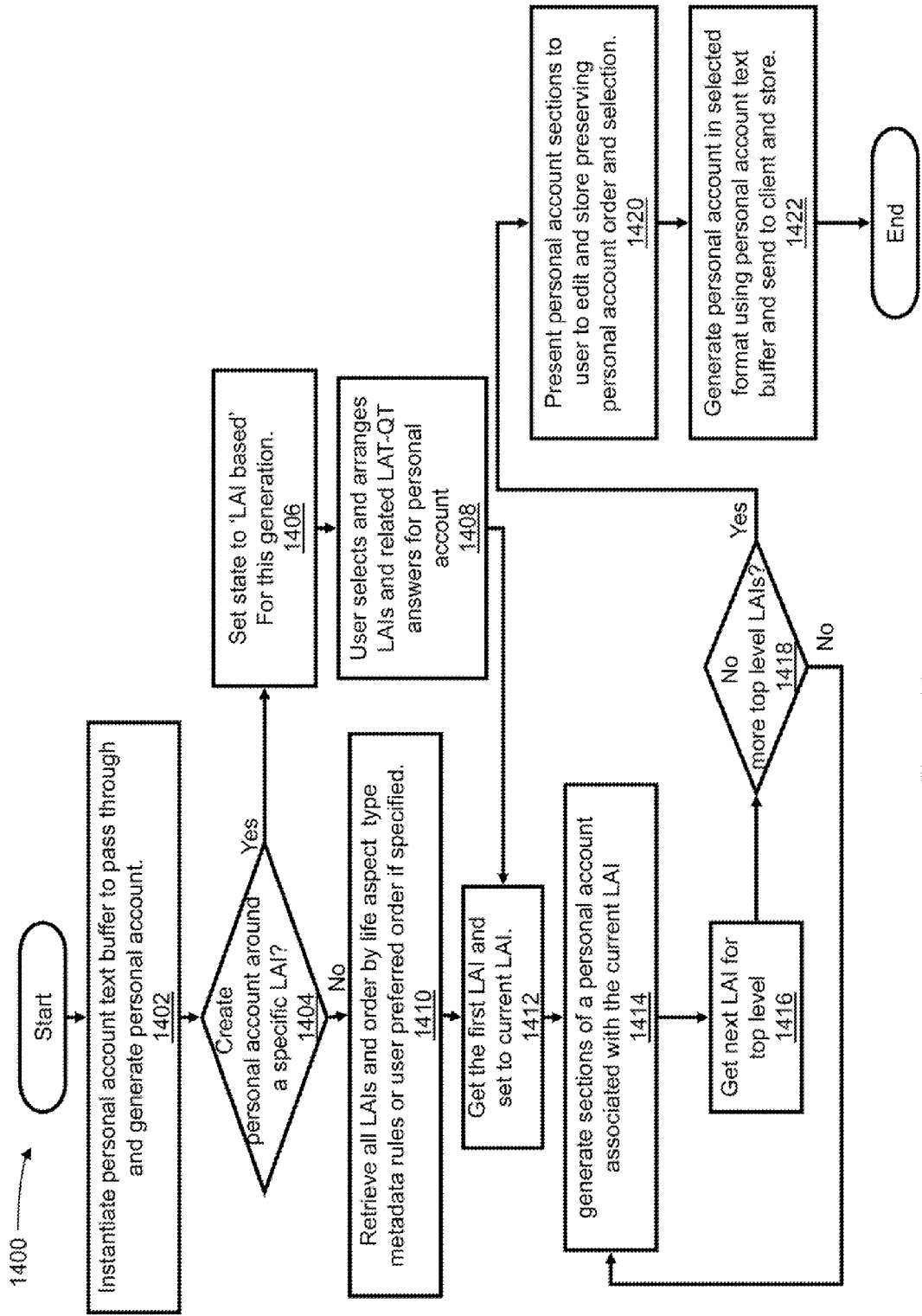
FIG. 14 depicts a flowchart of an example of a method for generating a personal account.

FIG. 14 depicts a flowchart of an example of a method 1400 for generating a personal account. The method is organized as a sequence of modules in the flowchart 1400. However, it should be understood that these and other modules associated with other methods described herein may be reordered for parallel execution or into different sequences of modules.

In the example of FIG. 14, the flowchart starts at module 1402 with instantiating a personal account text buffer to pass through the following process to generate personal account.

In the example of FIG. 14, the flowchart continues to decision module 1404 with determining if the user wants to create a personal account around a specific LAI. If the decision at 1404 is no, then the flowchart proceeds to module 1410, alternatively, if the decision at 1404 is yes, the flow chart proceeds to module 1406.

In the example of FIG. 14, the flowchart continues from decision module 1404 to module 1406 with setting state to 'LAI based' or this generation.

In the example of FIG. 14, the flowchart continues to module 1408 with user selecting and arranging LAIs and related LAT-QT answers for personal account.

In the example of FIG. 14, the flowchart continues from decision module 1404 to module 1410 with retrieving all LAIs and ordering them by life aspect type metadata rules or user preferred order if specified. The user may choose to order their LAIs manually themselves, in time, or by some other manner to their liking.

In the example of FIG. 14, the flowchart continues from module 1410 or module 1408 to module 1412 with getting the first LAI and setting it to the current LAI.

In the example of FIG. 14, the flowchart continues from module 1412 or decision module 1418 to module 1414 with generating sections of a personal account associated with an LAI.

In the example of FIG. 14, the flowchart continues to module 1416 with getting the next LAI for the top level. The top level includes the sections of the personal account that may include sub-sections but are not sub-sections to other sections. All the sections may include links to the top level sections.

In the example of FIG. 14, the flowchart continues to decision module 1418 with determining if there are any more top level LAIs. If the decision at 1418 is no, then the flowchart proceeds to module 1414, alternatively, if the decision at 1418 is yes, the flow chart proceeds to module 1420.

In the example of FIG. 14, the flowchart continues from decision module 1418 to module 1420 with generating a personal account in selected format using personal account text buffer and sending to client and storing. Selected formats may include proprietary formats for different word processing systems or file reading systems as well as web-pages, emails, audio readers and other forms of media that can support the interpretation and understanding of text. Having generated a personal account in selected format using personal account text buffer and sending to client and storing it, the flowchart terminates.

In the example of FIG. 14, the flowchart continues to module 1420 with presenting personal account sections to user to edit and store preserving personal account order and selections or inclusions. Edited sections are specific to this instance of a personal account and are stored in the user data repository. Editing sections for this personal account preserves the selection and arrangement of LAIs and related QT answers and the original QT answers.

In the example of FIG. 14, the flowchart continues from decision module 1420 to module 1422 with generating a personal account in selected format using personal account text buffer and sending to client and storing. Selected formats may include proprietary formats for different word processing systems or file reading systems as well as web-pages, emails, audio readers and other forms of media that can support the interpretation and understanding of text. Having generated a personal account in selected format using personal account text buffer and sending to client and storing it, the flowchart terminates.

Figure 15:
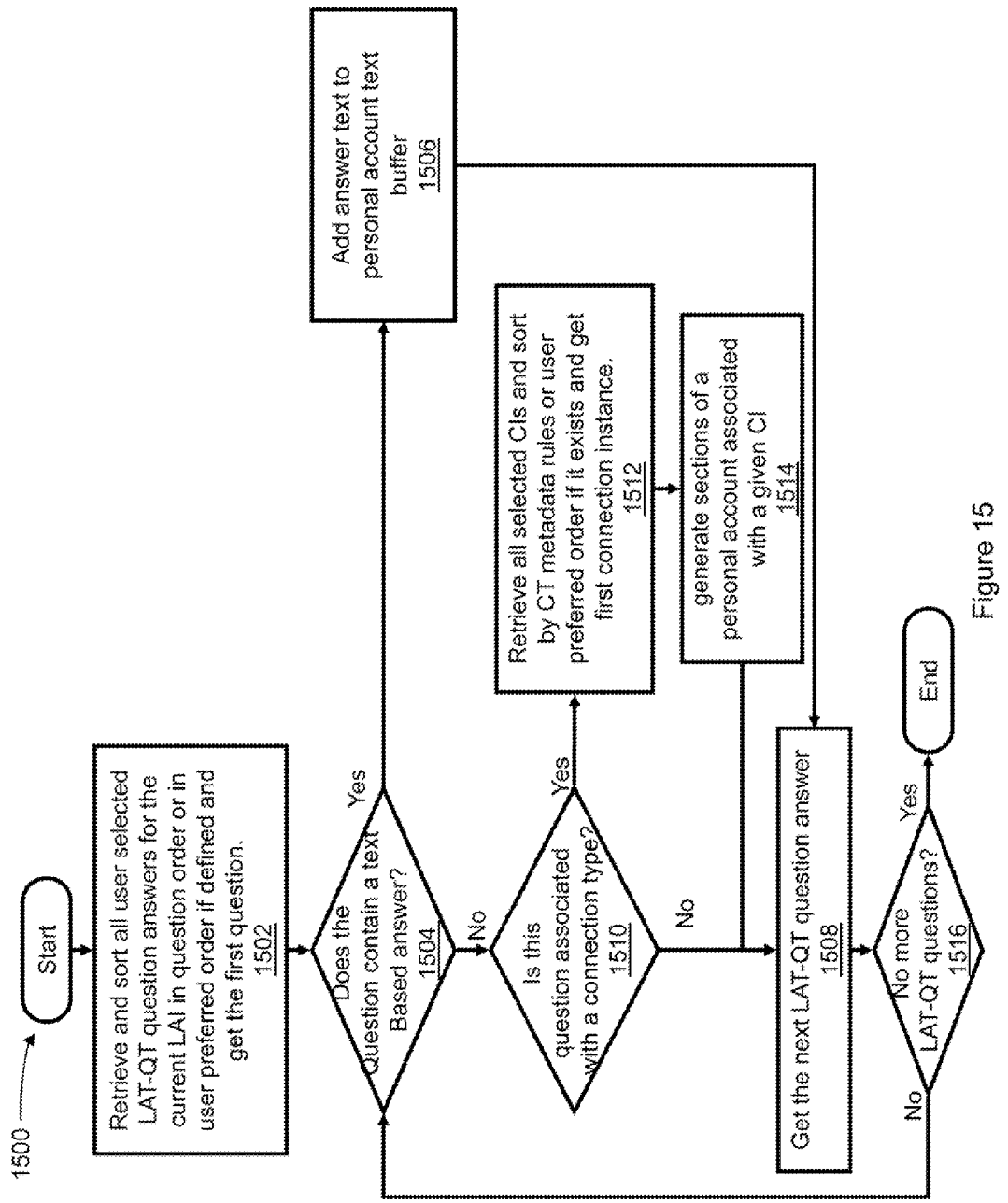
FIG. 15 depicts a flowchart of an example of a method for generating sections of a personal account associated with a current LAI.

FIG. 15 depicts a flowchart of an example of a method 1500 for generating sections of a personal account associated with a current LAI. The method is organized as a sequence of modules in the flowchart 1500. However, it should be understood that these and other modules associated with other methods described herein may be reordered for parallel execution or into different sequences of modules.

In the example of FIG. 15, the flowchart starts at module 1502 with retrieving and sorting all user selected LAT-QT question answers for the current LAI in question order or in user preferred order if defined and getting the first question. Users may arrange questions manually or based on various characterizations.

In the example of FIG. 15, the flowchart continues to from module 1502 or decision module 1516 to decision module 1504 with determining if the question include a text based answer. If the decision at 1504 is no, then the flowchart proceeds to module 1510, alternatively, if the decision at 1504 is yes, the flow chart proceeds to module 1506.

In the example of FIG. 15, the flowchart continues from decision module 1504 to module 1506 with adding answer text to personal account text buffer. Section text may include a section header rendered from the related CT-QT question section header template.

In the example of FIG. 15, the flowchart continues from module 1506 or decision module 1510 or module 1514 to module 1508 with getting the next LAT-QT question answer.

In the example of FIG. 15, the flowchart continues from decision module 1504 to decision module 1510 with determining if this question is associated with a connection type. If the decision at 1510 is no, then the flowchart proceeds to module 1508, alternatively, if the decision at 1510 is yes, the flow chart proceeds to module 1512.

In the example of FIG. 15, the flowchart continues from decision module 1510 to module 1512 with retrieving all selecting the CIs and sorting by CT metadata rules or user preferred order if it exists and getting first connection instance. Users may arrange CIs manually or based on various characterizations.

In the example of FIG. 15, the flowchart continues to module 1514 with generating sections of a personal account associated with a given CI.

In the example of FIG. 15, the flowchart continues to decision module 1516 with determining if there are any more LAT-QT questions. If the decision at 1516 is no, then the flowchart proceeds to decision module 1504, alternatively, if the decision at 1516 is yes, the flowchart terminates.

Figure 16:
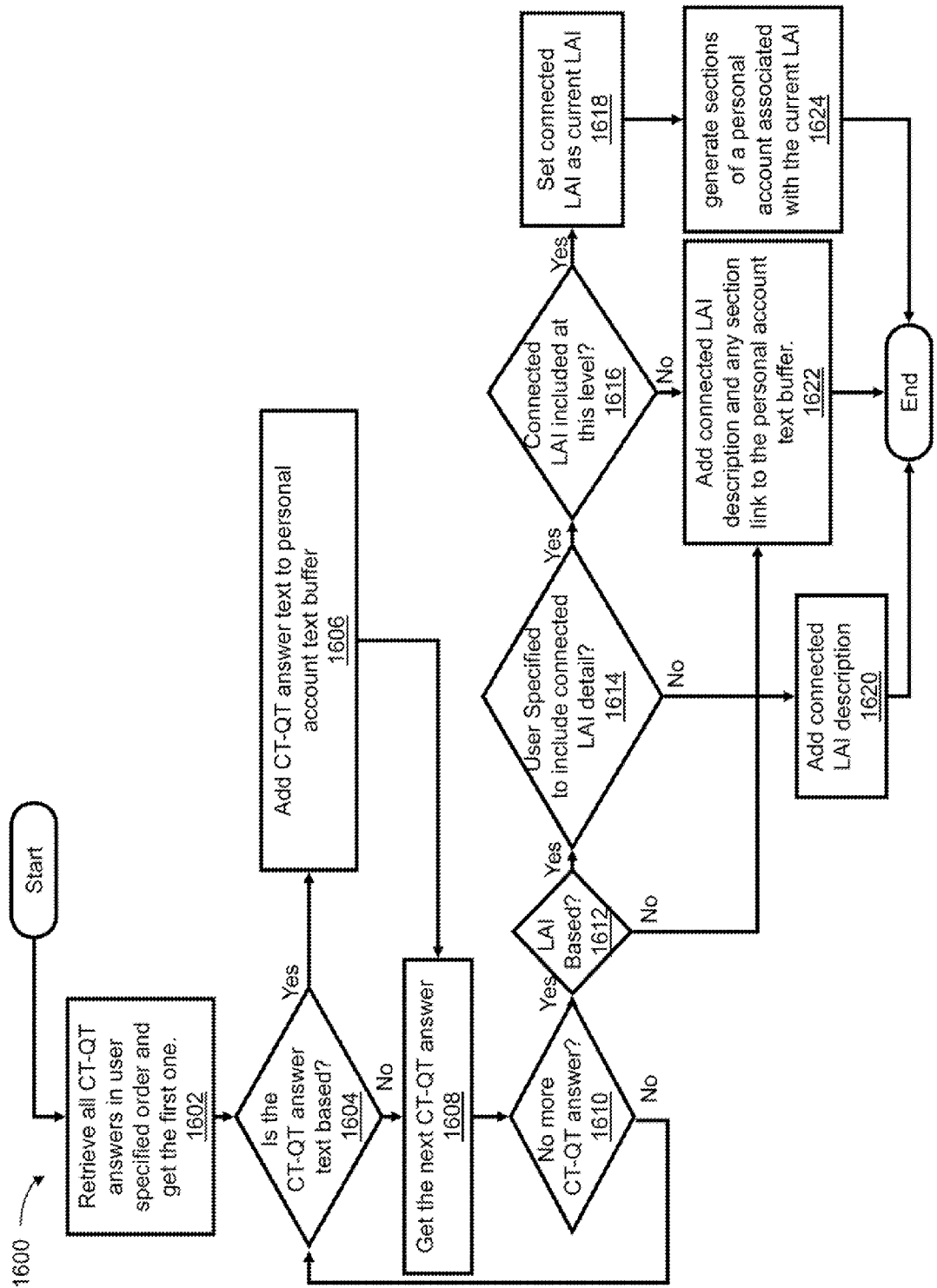
FIG. 16 depicts a flowchart of an example of a method for generating sections of a personal account associated with a given CI.

FIG. 16 depicts a flowchart of an example of a method 1600 for generating sections of a personal account associated with a given CI. The method is organized as a sequence of modules in the flowchart 1600. However, it should be understood that these and other modules associated with other methods described herein may be reordered for parallel execution or into different sequences of modules.

In the example of FIG. 16, the flowchart starts at module 1602 with retrieving all CT-QT answers in user specified order and getting the first one. Users may arrange questions manually or based on any other convenient characterization.

In the example of FIG. 16, the flowchart continues to decision module 1604 with determining if the CT-QT answer is text based. If the decision at 1604 is no, then the flowchart proceeds to module 1608, alternatively, if the decision at 1604 is yes, the flow chart proceeds to module 1606.

In the example of FIG. 16 the flowchart continues from decision module 1604 to module 1606 with adding CT-QT answer text to personal account text buffer. Section text may include a section header rendered from the related CT-QT question section header template.

In the example of FIG. 16, the flowchart continues from decision module 1604 or module 1606 to module 1608 with getting the next CT-QT answer.

In the example of FIG. 16, the flowchart continues to decision module 1610 with determining if there are any more CT-QT answer. If the decision at 1610 is no, then the flowchart proceeds to decision module 1604, alternatively, if the decision at 1610 is yes, the flow chart proceeds to decision module 1612.

In the example of FIG. 16, the flowchart continues from decision module 1610 to decision module 1612 with determining if generation is LAI based. It is determined by looking up the user preferences from the user data repository. If the decision at 1612 is no, then the flowchart proceeds to decision module 1622, alternatively, if the decision at 1612 is yes, the flow chart proceeds to decision module 1614.

In the example of FIG. 16, the flowchart continues from decision module 1612 to decision module 1614 with determining if user specified to include connected LAI detail. 'LAI detail' means to include answers to CT-QT questions related to all CIs related to this LAI. It is determined by looking up the user preferences from the user data repository. If the decision at 1614 is no, then the flowchart proceeds to module 1620, alternatively, if the decision at 1614 is yes, the flow chart proceeds to decision module 1616.

In the example of FIG. 16, the flowchart continues from decision module 1614 to decision module 1616 with determining if the connected LAI is included at this level. It is determined by looking up the user preferences from the user data repository. If the decision at 1616 is no, then the flowchart proceeds to module 1622, alternatively, if the decision at 1616 is yes, the flow chart proceeds to decision module 1618.

In the example of FIG. 16, the flowchart continues from decision module 1616 to module 1618 with setting the connected LAI as the current LAI.

In the example of FIG. 16, the flowchart continues from decision module 1614 to module 1620 with adding the connected LAI description. The connected LAI description is a specific LAT-QT describe question whose text answer is used for the personal account descriptions. Having added the LAI description, the flowchart terminates.

In the example of FIG. 16, the flowchart continues from decision module 1612 or decision module 1616 to module 1622 with adding the connected LAI description and any section links to the personal account text buffer. The section link is specific to the format of the output text and is only included for formats that support links. Having added the connected LAI description and any link tags to personal account text buffer, the flowchart terminates.

In the example of FIG. 16, the flowchart continues from decision module 1618 to module 1624 with generating sections of a personal account associated with the current LAI, generated sections of a personal account associated with the current LAI, the flowchart terminates.

Figure 17:
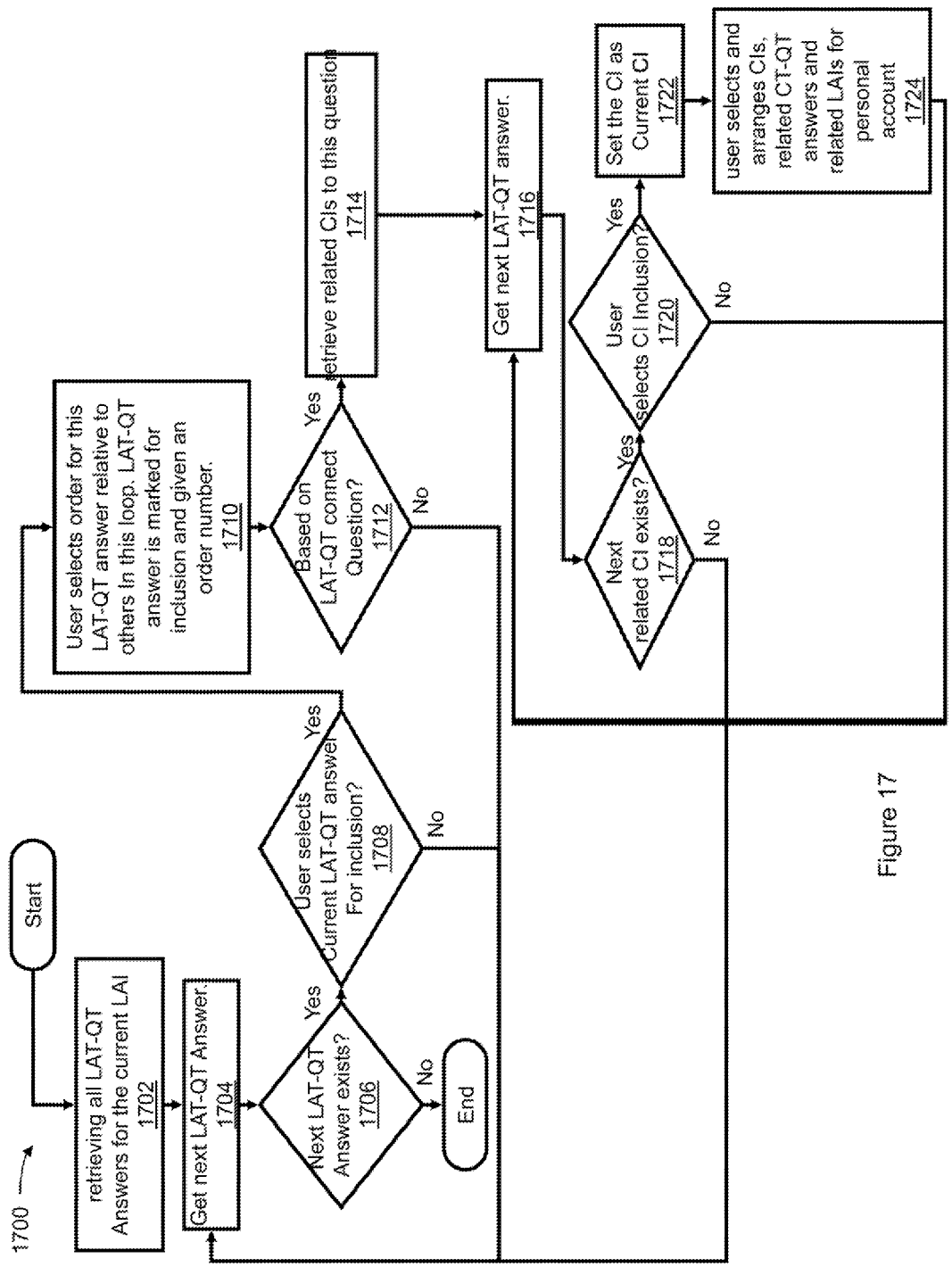
FIG. 17 depicts a flowchart of an example of a method for user selecting and arranging LAIs and related LAT-QT answers for personal account.

FIG. 17 depicts a flowchart of an example of a method 1700 for user selecting and arranging LAIs and related LAT-QT answers for personal account. The method is organized as a sequence of modules in the flowchart 1700. However, it should be understood that these and other modules associated with other methods described herein may be reordered for parallel execution or into different sequences of modules.

In the example of FIG. 17, the flowchart starts at module 1702 with retrieving all the LAT-QT answer for the current LAI. In the example of FIG. 17, the flowchart continues from module 1702 or decision module 1708 or decision module 1712 to module 1704 with getting the next LAT-QT answer In the example of FIG. 17, the flowchart continues to decision module 1706 with determining if the next LAT-QT answer exists. If the decision at 1706 is no, then the flowchart terminates, alternatively, if the decision at 1706 is yes, the flow chart proceeds to decision module 1708.

In the example of FIG. 17, the flowchart continues from decision module 1706 to decision module 1708 with prompting the user to select the current LAT-QT answer for inclusion. If the decision at 1708 is no, then the flowchart proceeds to module 1704, alternatively, if the decision at 1708 is yes, the flow chart proceeds to module 1710.

In the example of FIG. 17, the flowchart continues from decision module 1706 to module 1710 with user selecting the order for this LAT-QT answer relative to others in this loop. LAT-QT answer is marked for inclusion and given an order number.

In the example of FIG. 17, the flowchart continues to from module 1712 with determining if LAT-QT answer is based on a LAT-QT connect answer. If the decision at 1712 is no, then the flowchart proceeds to module 1704, alternatively, if the decision at 1712 is yes, the flow chart proceeds to module 1714.

In the example of FIG. 17, the flowchart continues from decision module 1712 to module 1714 with retrieving related CIs to this question.

In the example of FIG. 17, the flowchart continues from module 1714 or decision module 1720 or module 1724 to module 1716 with getting the next LAT-QT answer.

In the example of FIG. 17, the flowchart continues to decision module 1718 with determining if the next related CI exists. If the decision at 1718 is no, then the flowchart proceeds to module 1704, alternatively, if the decision at 1718 is yes, the flow chart proceeds to decision module 1720.

In the example of FIG. 17, the flowchart continues from decision module 1718 to decision module 1720 with the user deciding if the CI should be included. If the decision at 1720 is no, then the flowchart proceeds to module 1716, alternatively, if the decision at 1720 is yes, the flow chart proceeds to module 1722.

In the example of FIG. 17, the flowchart continues from decision module 1720 to module 1722 with setting the CI to the current CI.

In the example of FIG. 17, the flowchart continues to module 1724 with user selecting and arranging CIs, related CT-QT answers and related LAIs for personal account.

Figure 18:
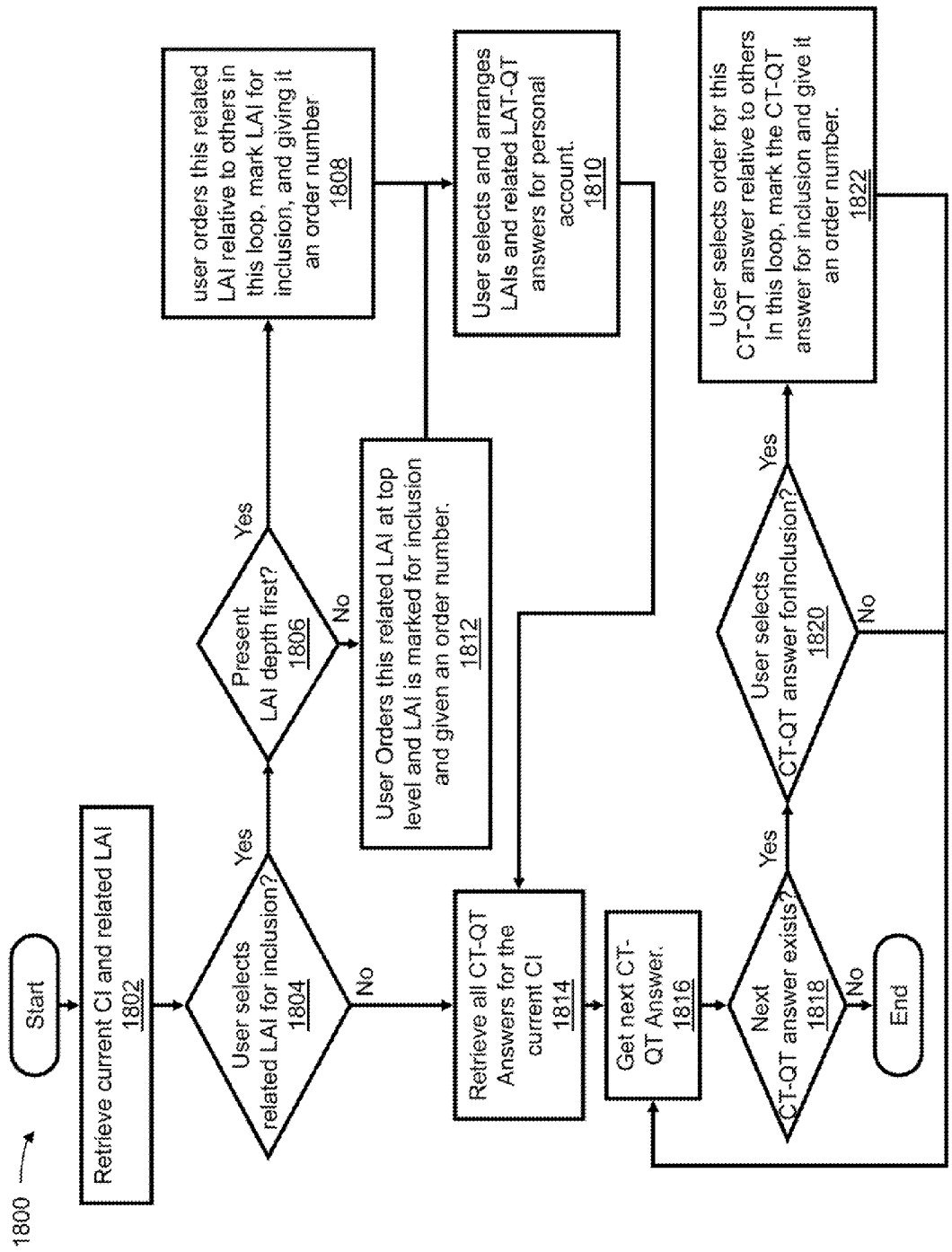
FIG. 18 depicts a flowchart of an example of a method for user selecting and arranging CIs, related CT-QT answers and related LAIs for personal account.

FIG. 18 depicts a flowchart of an example of a method 1800 for user selecting and arranging CIs, related CT-QT answers and related LAIs for personal account. The method is organized as a sequence of modules in the flowchart 1800. However, it should be understood that these and other modules associated with other methods described herein may be reordered for parallel execution or into different sequences of modules.

In the example of FIG. 18, the flowchart starts at module 1802 with retrieving current CI and related LAI.

In the example of FIG. 18, the flowchart continues to decision module 1804 with prompting the user if they want to select the related LAI for inclusion. If the decision at 1804 is no, then the flowchart proceeds to module 1814, alternatively, if the decision at 1804 is yes, the flow chart proceeds to decision module 1806.

In the example of FIG. 18, the flowchart continues from decision module 1804 to decision module 1806 with prompting the user if they want to present LAI depth first. If the decision at 1806 is no, then the flowchart proceeds to module 1812, alternatively, if the decision at 1806 is yes, the flow chart proceeds to module 1806.

In the example of FIG. 18, the flowchart continues from decision module 1806 to module 1808 with user ordering this related LAI relative to others in this loop, marking the LAI for inclusion, and giving it an order number.

In the example of FIG. 18, the flowchart continues from module 1808 or module 1812 to module 1810 with user selecting and arranging LAIs and related LAT-QT answers for personal account. The referenced LAI in this module is the connected LAI.

In the example of FIG. 18, the flowchart continues from decision module 1806 to module 1812 with user ordering this related LAI at top level and marking it for inclusion, and giving it an order number.

In the example of FIG. 18, the flowchart continues from module 1804 or module 1810 to module 1814 with retrieving all CT-QT answers for the current CI.

In the example of FIG. 18, the flowchart continues from module 1814 or module 1822 to module 1816 with getting the next CT-QT answer.

In the example of FIG. 18, the flowchart continues to decision module 1818 determining if the next CT-QT answer exists. If the decision at 1818 is no, then the flowchart terminates, alternatively, if the decision at 1818 is yes, the flow chart proceeds to decision module 1820.

In the example of FIG. 18, the flowchart continues from decision module 1818 to decision module 1820 with prompting the user if they want to select the CT-QT answer for inclusion. If the decision at 1820 is no, then the flowchart proceeds to module 1816, alternatively, if the decision at 1820 is yes, the flow chart proceeds to module 1822.

In the example of FIG. 18, the flowchart continues from decision module 1820 to module 1822 with user selecting the order for this CT-QT answer relative to others in this loop, marking the CT-QT answer for inclusion, and given an order number.

Figure 19:
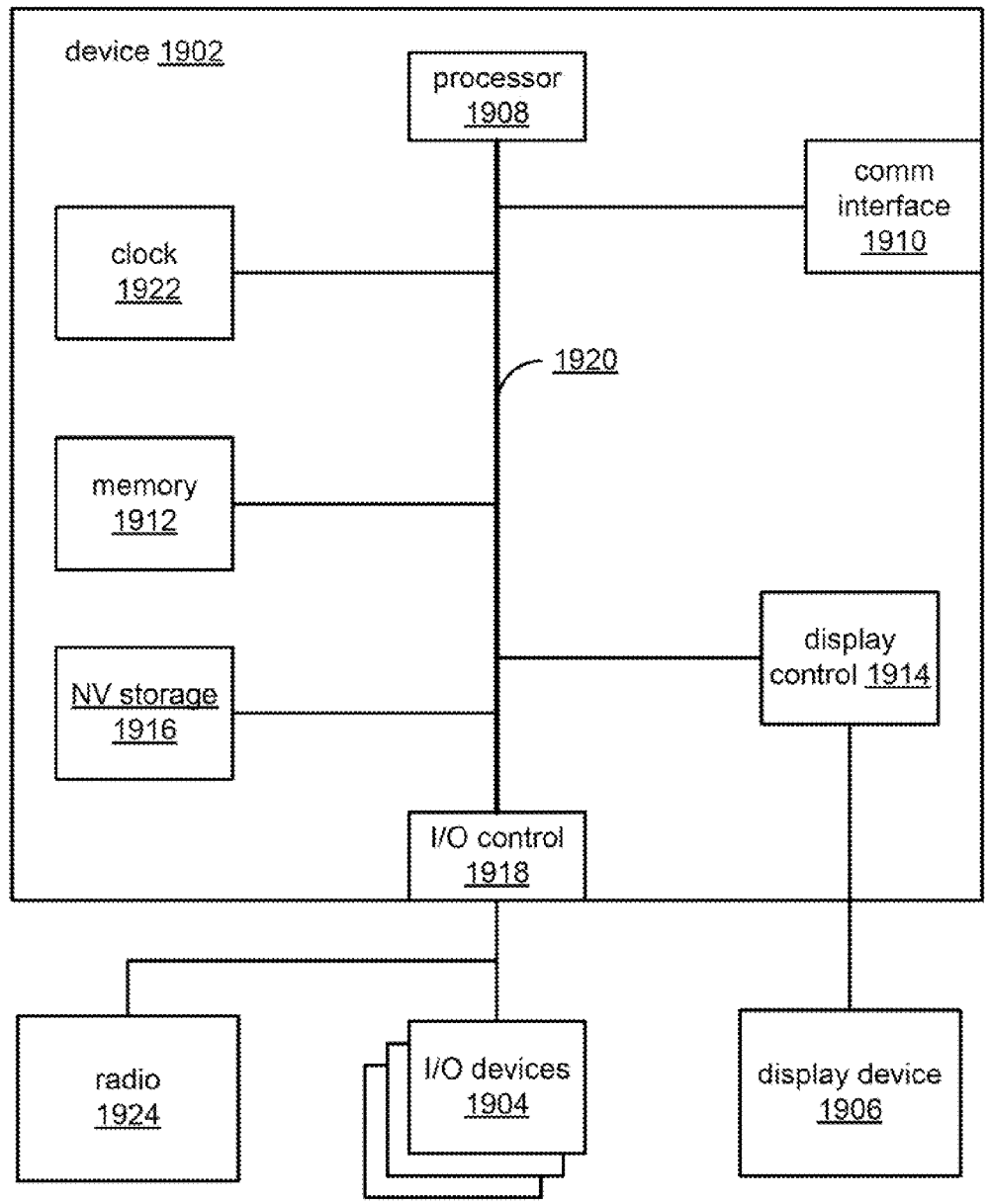
FIG. 19 depicts a system useful for generating navigable readable personal accounts.

FIG. 19 depicts a system useful for generating navigable readable personal accounts. The system 1900 may be a conventional computer system that can be used as a client computer system, such as a wireless client or a workstation, or a server computer system. The system 1900 includes a device 1902, I/O devices 1904, and a display device 1906. The device 1902 includes a processor 1908, a communications interface 1910, memory 1912, display controller 1914, non-volatile storage 1916, I/O controller 1918, clock 1922, and radio 1924. The device 1902 may be coupled to or include the I/O devices 1904 and the display device 1906.

The device 1902 interfaces to external systems through the communications interface 1910, which may include a modem or network interface. It will be appreciated that the communications interface 1910 can be considered to be part of the system 1900 or a part of the device 1902. The communications interface 1910 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 1908 may be, for example, a conventional microprocessor such as an Intel Pentium microprocessor or Motorola power PC microprocessor. The memory 1912 is coupled to the processor 1908 by a bus 1920. The memory 1912 can be Dynamic Random Access Memory (DRAM) and can also include Static RAM (SRAM). The bus 1920 couples the processor 1908 to the memory 1912, also to the non-volatile storage 1916, to the display controller 1914, and to the I/O controller 1918.

The I/O devices 1904 can include a keyboard, disk drives, printers, a scanner, and other input and output devices, including a mouse or other pointing device. The display controller 1914 may control in the conventional manner a display on the display device 1906, which can be, for example, a cathode ray tube (CRT) or liquid crystal display (LCD). The display controller 1914 and the I/O controller 1918 can be implemented with conventional well known technology.

The non-volatile storage 1916 is often a magnetic hard disk, flash memory, an optical disk, or another form of storage for large amounts of data. Some of this data is often written, by a direct memory access process, into memory 1912 during execution of software in the device 1902. One of skill in the art will immediately recognize that the terms "machine-readable medium" or "computer-readable medium" includes any type of storage device that is accessible by the processor 1908.

Clock 1922 can be any kind of oscillating circuit creating an electrical signal with a precise frequency. In a non-limiting example, clock 1922 could be a crystal oscillator using the mechanical resonance of vibrating crystal to generate the electrical signal.

The radio 1924 can include any combination of electronic components, for example, transistors, resistors and capacitors. The radio is operable to transmit and/or receive signals.

The system 1900 is one example of many possible computer systems which have different architectures. For example, personal computers based on an Intel microprocessor often have multiple buses, one of which can be an I/O bus for the peripherals and one that directly connects the processor 1908 and the memory 1912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1912 for execution by the processor 1908. A Web TV system, which is known in the art, is also considered to be a computer system, but it may lack some of the features shown in FIG. 19, such as certain input or output devices. A typical computer system will usually include at least a processor, memory, and a bus coupling the memory to the processor.

In addition, the system 1900 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1916 and causes the processor 1908 to execute the various acts required by the operating system to input and output data and to store data in memory, including storing files on the non-volatile storage 1916.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A system for rendering a personal account of a subjective human experience comprising:
    an interview engine operable to receive requests and generate and render a personal account using a computer interview through collecting during the computer interview for storage in a bi-directional fully connected graph;
    a view generation engine operable to traverse the bi-directional fully connected graph using navigational structures to traverse CIs (Connection Instances) and LAIs (Life Aspect Instances) on the bi-directional fully connected graph;
    a mental association model metadata repository including LATs (Life Aspect Types), CTs (Connection Types), QTs (Question Templates) associated with the LATs and CTs, and collections of QTs as metadata scripts;
    a user data repository including user created instances for the bi-directional fully connected graph including LAIs and CIs, the user data repository also including state information, and stored personal accounts edited from selected QT answers stored on selected LAIs and CIs; and
    a view generation metadata repository including metadata useful in preparing a personal account from the bi-directional fully connected graph.

2. The system of claim 1, wherein the view generation metadata repository includes rules for presenting LAIs and CIs for selection in a personal account.

3. The system of claim 1, wherein the view generation metadata repository includes rules for preparing and presenting QT answers as metadata scripts.

4. The system of claim 1, wherein the view generation metadata repository includes rules for presenting LAIs and CIs for selection in a personal account include breadth first or depth first traversal of LAI and CI graphs.

5. The system of claim 1, wherein the Question Types cover a variety of mental retrieval modes.

6. The system of claim 1, wherein QTs are collections of strings using the QT describe answers as tokens and to control the grammar such as tense, tone or inclusion of strings.

7. A method for growing a bidirectional fully connected graph to include a CI between LAIs of a subjective human experience through execution of instructions in memory coupled to a processor comprising:
    retrieving a current LAI defining a life aspect from a user data repository stored in memory coupled to a processor;
    traversing a LAT-QT set to identify a qualified and rendered LAT-QT question, the qualified and rendered LAT-QT question prepared to gather information useful in selecting related LAIs and describing the current LAI;
    presenting the qualified and rendered LAT-QT question via a web based interface;
    presenting any qualified matching LAIs for selection in creating CIs;
    receiving a LAT-QT answer to the qualified and rendered LAT-QT question, the LAT-QT answer defining the current LAI and a related LAI that was either selected or created and defining a CI connection between the current LAI and the related LAI;
    storing the LAT-QT answer in reference to LAI and CI in the user data repository;

creating, in a bi-directionally fully connected graph stored in memory, a CI or a reference connecting the current LAI and the related LAI;

traversing a CT-QT set to identify a qualified and rendered CT-QT question, the qualified and rendered CT-QT question prepared to gather information useful in connecting the current LAI and the related LAI;

presenting the qualified and rendered CT-QT question via the web based interface;

receiving a CT-QT answer to the qualified and rendered CT-QT question; and storing the CT-QT answer in reference to the CI in the user data repository.

8. The method of claim 7, further comprising retrieving the current LAI state information including the last QT question and all previously selected or created related LAIs that lead to the current LAI or 'train of thought'.

9. The method of claim 7, Wherein the related LAI is received from an interface during a computer interview.

10. The method of claim 7, further comprising generating, sections of a personal account associated with the current LAI.

11. The method of claim 7, wherein the current LAI, the related LAI and the CI is retrieved from the user data repository stored in memory.

12. The method of claim 7, further comprising receiving a selection and arrangement of LAIs and related QT answers for a personal account.

13. The method of claim 7, further comprising presenting a personal account to a user to edit and store QT answers as separate sections of a personal account preserving the selection and arrangement of LAIs and related QT answers and preserving the original QT answers.

14. The method of claim 7, further comprising transmitting as personal account.

15. The method of claim 7, wherein the Question Types cover a variety of mental retrieval modes.

16. A data structure useful for storing a personal account embodied in a non-transitory computer readable medium comprising:

a plurality of LAIs stored as nodes of a bi-directional fully-connected graph, each LAI defining a life aspect relatable to other LAIs, the LAIs having answers to LAT-QT questions stored therein and useful to the preparation of a navigable, readable, personal account; and a plurality of CIs stored as nodes of the bi-directional fully-connected graph, each CI connecting LAIs to define the bi-directional fully-connected graph, the CIs having answers to CT-QTs questions stored therein and useful to the preparation of a navigable, readable, personal account.

17. The data structure of claim 16, wherein a CI is added thereby connecting two LAIs of the plurality of LAIs.

18. The data structure of claim 16, wherein a LAI is added as a node in the plurality of LAIs stored as nodes in the bi-directionally fully connected graph.

\* \* \* \* \*